United States Patent
Reome et al.

(10) Patent No.: US 10,438,036 B1
(45) Date of Patent: Oct. 8, 2019

(54) SYSTEM AND METHOD FOR READING AND DECODING ID CODES ON A CURVED, SLOPED AND/OR ANNULAR OBJECT

(71) Applicant: Cognex Corporation, Natick, MA (US)

(72) Inventors: Matthew R. Reome, Framingham, MA (US); Ali M. Zadeh, Greenville, SC (US); Robert A. Wolff, Sherborn, MA (US); Ruibing Wang, Framingham, MA (US); Aaron S. Wallack, Natick, MA (US); David J. Michael, Wayland, MA (US); Hongwei Zhu, Natick, MA (US); Benjamin D. Klass, Worcester, MA (US)

(73) Assignee: Cognex Corporation, Natick, MA (US)

( * ) Notice: Subject to any disclaimer, the term of this patent is extended or adjusted under 35 U.S.C. 154(b) by 0 days.

(21) Appl. No.: 15/347,746

(22) Filed: Nov. 9, 2016

Related U.S. Application Data

(60) Provisional application No. 62/253,118, filed on Nov. 9, 2015.

(51) Int. Cl.
*G06K 7/14* (2006.01)
*G06K 7/10* (2006.01)

(52) U.S. Cl.
CPC ....... *G06K 7/1404* (2013.01); *G06K 7/10544* (2013.01); *G06K 7/10861* (2013.01); *G06K 7/1491* (2013.01)

(58) Field of Classification Search
None
See application file for complete search history.

(56) References Cited

U.S. PATENT DOCUMENTS

| 7,173,622 B1 | 2/2007 | McLaughlin |
| 2009/0134221 A1* | 5/2009 | Zhu .................. A47F 9/046 235/383 |

(Continued)

FOREIGN PATENT DOCUMENTS

| CN | 205562011 U | 9/2016 |
| CN | 106441200 A | 2/2017 |

(Continued)

OTHER PUBLICATIONS

Micro-Epsilon Messtechnik GMBH & Co. KG, "Automatic Tire Identification and Dot Code Reading", Published in: USA, Publication Date: On or before Oct. 15, 2015.

(Continued)

*Primary Examiner* — Kristy A Haupt
(74) *Attorney, Agent, or Firm* — Loginov IP

(57) ABSTRACT

This invention provides a system and method for reading and decoding ID features located on a surface of a curved, sloped and/or annular object, such as a tire moving on a conveyor. A plurality of 3D sensors are operatively connected to a vision system processor. The sensors are calibrated by calibration parameters to generate a stitched-together 3D image of a field of view in a common coordinate space. A motion conveyance (e.g. a conveyor) causes the object and the 3D sensors to move in relative motion, and the conveyance provides motion information to the vision system processor. An ID finder locates ID features within a version of the 3D image and a decoder (e.g. an OCR reader) generates data from the ID features. The ID finder can locate a trained portion of the ID and the search for variable code elements at a known orientation relative to the trained portion.

23 Claims, 19 Drawing Sheets

(56) References Cited

U.S. PATENT DOCUMENTS

2010/0315419 A1   12/2010   Baker
2011/0102550 A1   5/2011   Daniel et al.

FOREIGN PATENT DOCUMENTS

JP   2011129082 A   6/2011
KR   20170135914 A   12/2017
WO   2017041418 A1   3/2017

OTHER PUBLICATIONS

"DS1100 OCR Automotive Tire Dot Inspection", Jul. 31, 2013, Published in: USA, https://www.youtube.com/watch?v=e6df2QNUK5w.
"Keyence LJ7000 Tire OCR", Jul. 1, 2015, Published in: USA, https://www.youtube.com/watch?v=c1VJIO5DgOY.

\* cited by examiner

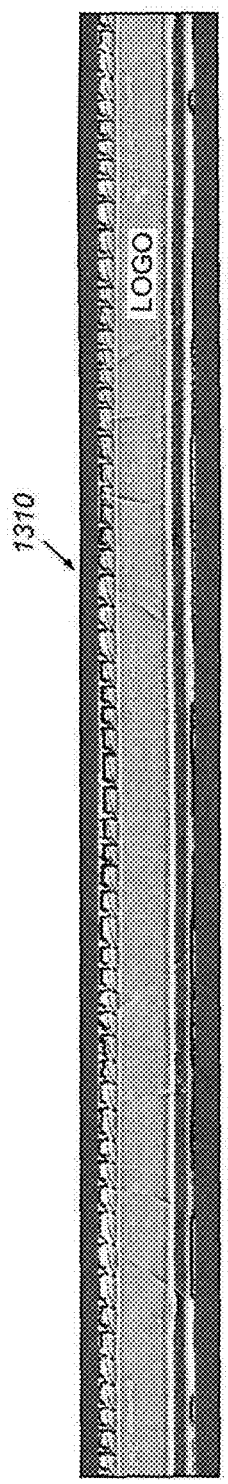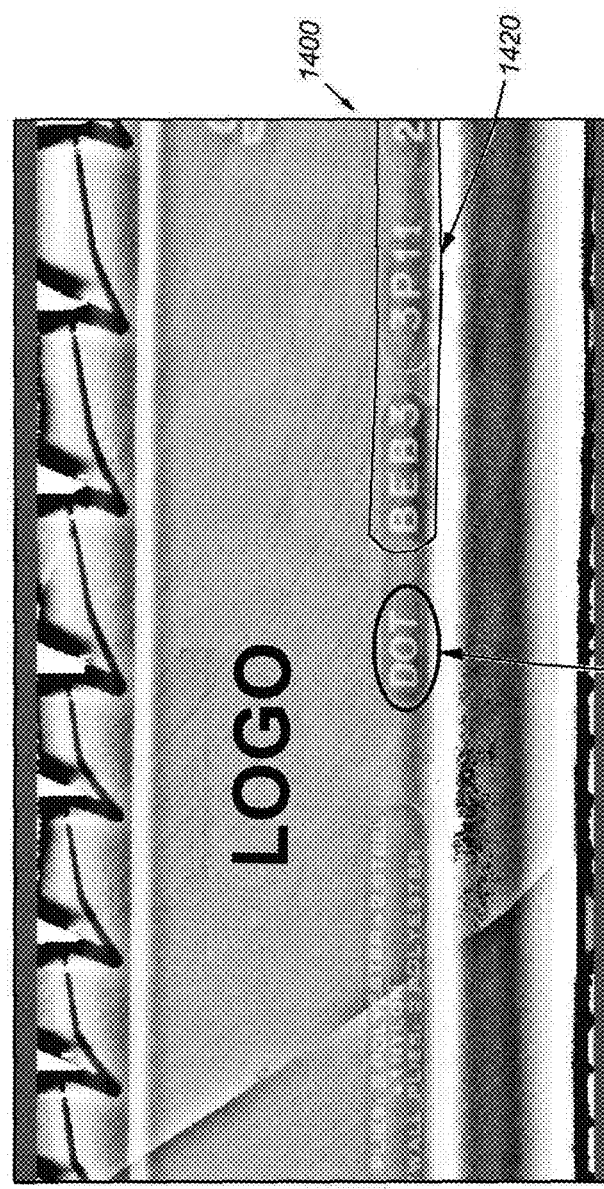
Fig. 13
Fig. 14

SYSTEM AND METHOD FOR READING AND DECODING ID CODES ON A CURVED, SLOPED AND/OR ANNULAR OBJECT

RELATED APPLICATION

This application claims the benefit of U.S. Provisional Application Ser. No. 62/253,118, entitled SYSTEM AND METHOD FOR READING AND DECODING ID CODES ON A CURVED, SLOPED AND/OR ANNULAR OBJECT, filed Nov. 9, 2015, the teachings of which are expressly incorporated herein by reference.

FIELD OF THE INVENTION

This invention relates to vision systems that read and decode symbology codes (IDs), and more particularly to vision systems arranged to read and decode codes formed on three-dimensionally featured surfaces.

BACKGROUND OF THE INVENTION

In manufacturing and assembly processes, it is often desirable to analyze an object surface to determine the nature of features and/or irregularities. The displacement (or "profile") of the object surface can be determined using a machine vision system (also termed herein "vision system") in the form of a laser displacement sensor (also termed a laser beam "profiler"). A laser displacement sensor uses a planar curtain or "fan" of a laser beam (also termed herein a "laser plane") to capture and determine the two-dimensional profile of a scanned object surface within the laser plane and transverse to the beam propagation path. Multiple two-dimensional profiles may be assembled to create a three-dimensional (3D) representation. In a conventional arrangement, a vision system camera assembly is oriented to view the plane of the beam from outside the plane. This arrangement captures the profile of the projected line (e.g. extending along the physical x-axis) on the object surface, which, due to the baseline (i.e. the relative spacing along the y-axis) between the beam (sometimes characterized as a "fan") plane and the camera causes the imaged line to appear as varying in the image y-axis direction as a function of the physical z-axis height of the imaged point (along the image x axis). This deviation represents the profile of the surface. Laser displacement sensors are useful in a wide range of inspection and manufacturing operations where the user desires to measure and characterize surface details of a scanned object via triangulation. One form of laser displacement sensor uses a vision system camera having a lens assembly and image sensor (or "imager") that can be based upon a CCD or CMOS design. The imager defines a predetermined field of grayscale or color-sensing pixels on an image plane that receives focused light from an imaged scene through a lens.

In a typical arrangement, the displacement sensor(s) and/or object are in relative motion (usually in the physical y-coordinate direction) so that the object surface is scanned by the sensor(s), and a sequence of images are acquired of the laser line at desired spatial intervals—typically in association with an encoder or other motion measurement device (or, alternatively, at time based intervals). Each of these single profile lines is typically derived from a single acquired image. These lines collectively describe the surface of the imaged object and surrounding imaged scene and define a "range image" or "depth image".

Other camera assemblies can also be employed to capture a 3D image (range image) of an object in a scene. The term range image is used to characterize an image (a two-dimensional array of values) with pel values characterizing Z height at each location, or characterizing that no height is available at that location. The term range image is alternatively used to refer to generic 3D data, such as 3D point cloud data, or 3D mesh data. The term range and gray image is used to characterize an image with pel values characterizing both z-height and associated gray level at each location, or characterizing that no height is available at that location, or alternatively a range and gray image can be characterized by two corresponding images—one image characterizing z-height at each location, or characterizing that no z-height is available at that location. For example, structured light systems, stereo vision systems, DLP metrology, and other arrangements can be employed. These systems all generate an image that provides a height value (e.g. z-coordinate) to pixels.

A 3D range image generated by various types of camera assemblies (or combinations thereof) can be used to locate and determine the presence and/or characteristics of particular features on the object surface. In certain vision system implementations, such as the inspection of circuit boards, a plurality of displacement sensors (e.g. laser profilers) are mounted together to extend the overall field of view (FOV) (wherein the term "field of view" refers to measurement range) of the vision system so as to fully image a desired area of the object (e.g. its full width) with sufficient resolution. In the example of a laser profiler, the object moves in relative motion with respect to the camera(s) so as to provide a scanning function that allows construction of a range (or, more generally a "3D") image from a sequence of slices acquired at various motion positions. This is often implemented using a conveyor, motion stage, robot end effector or other motion conveyance. This motion can be the basis of a common (motion) coordinate space with the y-axis defined along the direction of "scan" motion.

3D sensors can be used to acquire images of surfaces that contain various types of symbology codes, also termed simply "IDs". IDs are arranged to that geometric shapes therein contain various data (e.g. alphanumeric data) that conveys information to the reader about the underlying object or other subject matter (e.g. an address, a website URL, etc.). In many applications, such IDs are used to identify, and allow tracking of, objects passing through a production or logistics operation—often on a moving conveyor that transports the objects between various handling/manufacturing stations. Such IDs can constitute (e.g.) so-called one-dimensional (1D) barcodes or so-called two-dimensional (2D) codes, including (e.g.) QR codes, DotCode, etc.). IDs can be applied to a surface by direct printing, adhesive labels, peening and/or surface formation—such as molding the code into the surface of the object, thereby defining 3D surface features with the elements of the ID. As defined herein IDs can also be considered strings of alphanumeric characters and/or graphics applied to an object surface. Such characters/graphics can be detected, identified, read, or decoded using appropriate processes and/or processors including optical character recognition (OCR) reading hardware and/or software routines.

At various locations along a conveyor line transporting ID-containing objects, an ID reading arrangement (an "ID reader") and associated process(ors)(es) and/or software can be provided to image objects passing thereunder. One or more 3D sensors can be employed to scan the surface of an object moving along the conveyor through the ID reader arrangement. However, IDs on objects having certain shapes, sizes and/or surface textures can prove highly challenging to read and decode accurately, particularly at a reasonable throughput speed. For example, it is often challenging to decode IDs molded into the surface of curved and/or sloped objects, such as annular/toroidal vehicle tires. Tires are relatively large and the ID can be located in a small discrete area on the overall surface. The surface can include a variety of textures, lettering and other 3D surface patterns that increase the challenge of finding and decoding an ID. Because tires are fairly large in radius, compared to the field of view (FOV) needed to provide a sufficiently high-resolution scan of the surface to resolve ID features, a plurality of 3D scanners are needed to provide a sufficient scan width. In addition, the side of a tire is often sloped increasing the difficulty of resolving ID features.

SUMMARY OF THE INVENTION

This invention overcomes disadvantages of the prior art by providing a system and method for reading and decoding ID features located on a surface of a curved, sloped and/or annular object, such as a tire that provides a wide, continuous field of view (FOV) sufficient to cover the entire width of the tire as it moves in relative motion to a plurality of 3D sensors, In one example, the sensors can generate a stitched-together or merged image from some or all of the acquired sensor images. The 3D sensors are calibrated to a common coordinate space and ID features are identified in the space. This common coordinate space allows all images to be presented to further processes as a single image and to be transformed into various rotations, tilts, heights and/or translations. The found ID features are decoded based upon (e.g.) a range image generated in the common coordinate space. In an embodiment, and/or where the surface is appropriately curved or annular, the image can be polar-unwrapped to provide a linear image of the annular surface, thereby increasing readability, and potentially improving the results or processing speed requirements of filters and feature location processes. The image can be filtered using (e.g. a high pass filter) to reduce the effect of surface curvature (i.e. by filtering gradually changing surface features), or can be re-rendered by estimating the orientation of a region around the ID features, fitting a plane to that region, and re-rendering that region of the image into a coordinate system (e.g. x, y, z) where the Z axis is normal to the plane. The region can be defined, and the ID can be located, by registering certain identifiable features on the surface, such as lettering that is placed at a predetermined orientation on the surface with respect to the ID features. Additionally, more generalized 3D curvature removal can be implemented, wherein the curved surface is estimated more closely by multiple planes (i.e. a polyhedron), a circular cylinder or generalized cylinder, a spline-fit surface, or any other appropriate representation of a 3D surface.

In an illustrative embodiment, a system and method for reading and decoding ID features located on a surface of a curved, sloped and/or annular object is provided. A plurality of 3D sensors are operatively connected to a vision system processor and calibrated by calibration parameters to generate (e.g.) a stitched-together 3D image of a field of view in a common coordinate space. A motion conveyance causes the object and the 3D sensors to move in relative motion. The conveyance provides motion information to the vision system processor. One or more ID finder/finders locate(s) ID features within a version of the 3D image. Illustratively, one or more ID decoder/decoders that decodes the ID features into decoded information. The ID finder/finders define(s) a region around the ID features relative to the surface, and the region is defined based upon predetermined features on the surface that are oriented with respect to the ID features. At least one of the predetermined features and the ID features can define alphanumeric characters. These characters can define the letters DOT. Illustratively, the image is polar-unwrapped to provide a linear image of the annular surface, and the ID finder/finders filter(s) the surface to reduce the effect of surface curvature. Illustratively, a filtering module removes missing pixels and spikes in an image based upon the 3D image. In embodiments, an image re-render defines a region on the surface around the ID features in the 3D image, and then determines a fit plane and relative orientation of the plane with respect to the coordinate space, the image re-renderer transforms the image into a re-rendered image such that the fit plane aligns with the x-y plane, reducing perspective distortion in the image. Illustratively, the 3D sensors comprise laser displacement sensors that project laser lines onto the object, and the laser lines can overlap in a direction orthogonal to a conveyance motion direction to reduce side occlusion on an imaged object and/or surface. Thus, the overlap is sufficient to image the ID features fully in each of adjacent 3D sensors. To prevent crosstalk, each of the laser lines can be offset from adjacent of the laser lines along the conveyance motion direction. In embodiments, the laser lines are strobed in a synchronized manner such that each area where laser lines overlap can be imaged by the sensors while only the laser line associated with a given sensor is active to prevent crosstalk without (free of) requiring an offset. In embodiments, two versions of the stitched image created by combining the individual discrete images from each displacement sensor (i.e. version A and version B) are produced. In an embodiment, a first of the stitched image versions uses results from the left-most sensor(s) in those areas where the two sensors images overlap, and a second of the versions uses results from the right-most sensor(s). In further embodiments, one or more combined images are created each containing a non-overlapping subset of the discrete images from each displacement sensor. For example, the version A consists of one set of alternating sensors along a line of sensors and version B consists of the other set of alternating sensors along the line (e.g. odd-numbered and even-numbered sensor sets). Illustratively, ID location is performed on results from each version and compared/combined to account for possible discontinuities in individual images that could affect the accuracy of the result. The reading/decoding of the detected code can be performed on each version (in which each version can be a stitched-together image) and the results compared/combined to produce a complete code to account errors resulting from possible discontinuities in the individual images.

Illustratively, there are at least two versions of the stitched-together image in which either: (a) a first of the versions is provided using values from the left-most sensor in those areas where the two sensors images overlap, and a second of the versions is provided using the values from the right-most sensor; or (b) a first of the versions is provided using values from one or more non-overlapping sensor images in an array of a plurality of the sensors, and additional versions are provided using values from other non-overlapping sensors images in the array of the plurality of the sensors, each of the versions being decoded by an ID decoder. The ID location can be performed on results from each version. The resulting, located IDs can be compared/combined to account for possible discontinuities in individual images that could affect the accuracy of the result. The results of a final reading/decoding of a detected ID/code from the ID features can performed on each version, and compared/combined to produce a complete code to account for errors resulting from possible discontinues in individual images. Illustratively, each version of the image is processed by the vision processor to find and decode ID features based upon a plurality of discrete parameters that differ in each of multiple models. At least one result of the process is selected as a candidate. Illustratively, a validator is provided, which combines decoded results from the ID features in a plurality of versions to determine validity of the decoded information.

In an illustrative embodiment, the sensors operate to acquire an image of the object based upon a level trigger mode that responds to sensing of the object by an upstream sensor of a leading edge and a trailing edge of the object passing through a sensing line. Based upon the passing of the leading edge and the trailing edge through the sensing line, and motion information provided by the motion conveyance, image acquisition is triggered so as to maintain a predetermined margin about an image of the object within a range of distance between the leading edge and the trailing edge

BRIEF DESCRIPTION OF THE DRAWINGS

The invention description below refers to the accompanying drawings, of which:

FIG. 13 is a diagram of a display of the polar unwrapped image of FIG. 12 with high pass filtering applied thereto;

FIG. 14 is a diagram of a display of a more detailed region of the image of FIG. 13 showing the ID/code feature(s) found by the system and method of the illustrative embodiment;

DETAILED DESCRIPTION

I. System Overview

Figure 1:
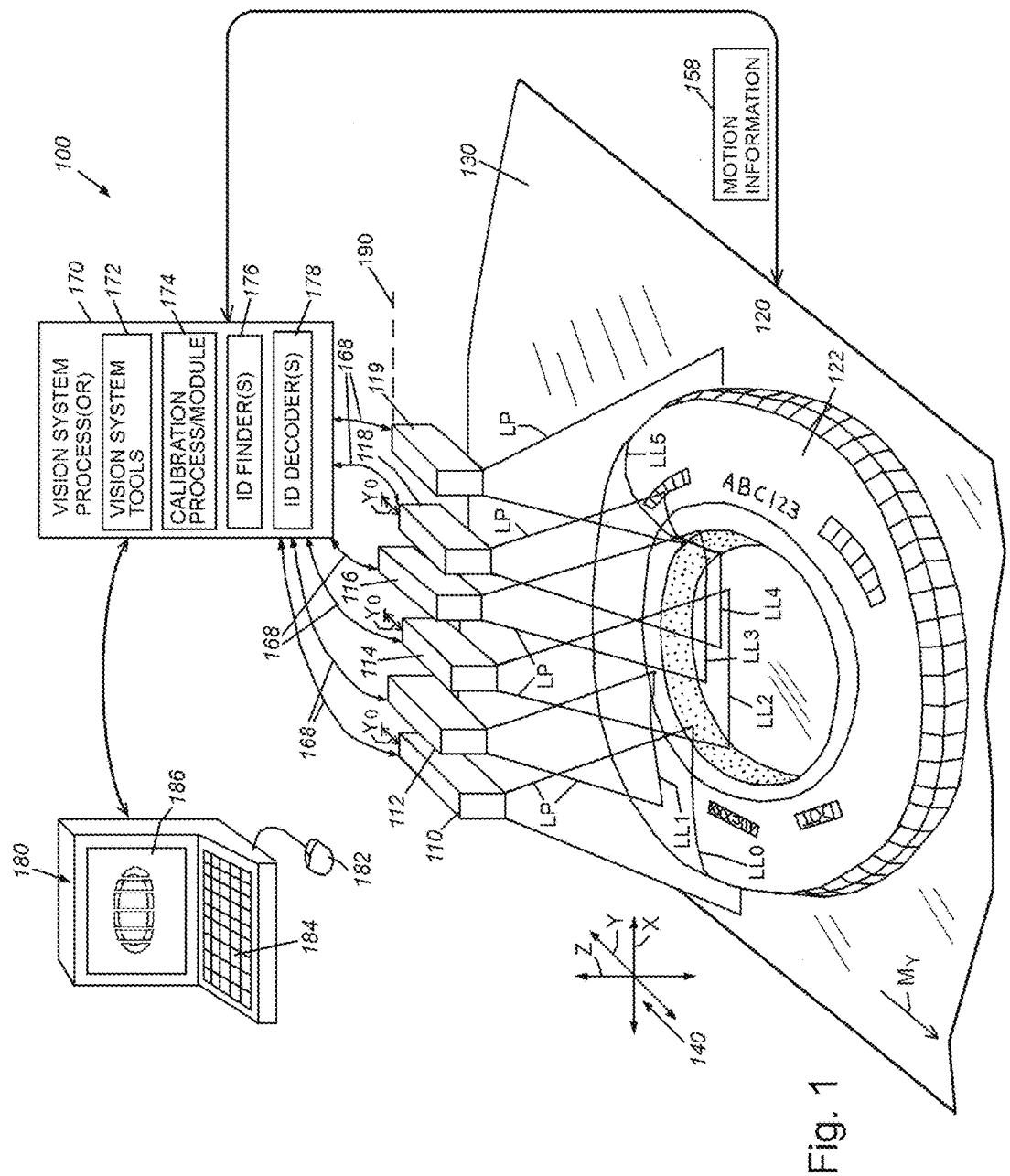
FIG. 1 is diagram of an exemplary vision system arrangement employing a plurality of 3D sensors in conjunction with a motion conveyance that provides relative motion between an annular or curved object (e.g. a tire on a conveyor belt) and the 3D sensors.

FIG. 1 details a vision system arrangement 100 that includes a plurality of (3D) displacement sensors 110, 112, 114, 116, 118 and 119. In this exemplary arrangement, six sensors are depicted. However, at least one and greater than four sensors can be employed as the exemplary "plurality" as defined herein. The sensors 110, 112, 114, 116, 118 and 119 can be arranged in a variety of orientations that are typically side-by-side with respect to each other as shown to define a widened (in the x-axis direction as defined below) field of view (FOV). The 3D sensors 110, 112, 114, 116, 118 and 119 in this exemplary arrangement are implemented as so-called laser profilers or laser displacement sensors that rely upon relative motion (arrow $M_y$) generated by a motion conveyance that acts along the y-axis direction between the sensor and the object 120 under inspection to provide a range image (also termed herein a "3D image") of the object 120. As described further below, the exemplary object, according to illustrative embodiments, is an annular, toroidal or curved-surface object, such as the depicted tire, in which the surface to be scanned defines an area along the motion-orthogonal x-direction (width) that is greater than the FOV of one of the 3D sensors at appropriate resolution. As described above, a tire defines a sidewall 122 that includes curve, tilt and variations in surface profile and texture that renders identification and decoding of information applied thereto (e.g. molded in the sidewall—as described further below) challenging with vision systems. Other similar objects—e.g. wheels, discs, etc. (among other objects) can also be scanned in accordance with the system and method herein.

As shown in FIG. 1, in this embodiment, motion $M_y$ is generated by an exemplary conveyor (although another conveyance, such as a motion stage, robot manipulator, etc., can be employed) 130. Alternatively, motion can be generated by the sensor mounting arrangement, or by both the conveyor and a moving sensor mount. As described above, any image acquisition device that acquires a range image (including a height dimension for a given image pixel—thereby providing (e.g.) x, y and z—axis values for the pixels that image the object) can be employed as the 3D sensor herein. Alternatively, the sensors can be adapted to acquire point cloud images, and the principles herein can be adapted for use with point cloud images instead of, or in addition to, range images.

By way of non-limiting example the depicted, exemplary laser displacement (3D) sensors 110, 112, 114, 116, 118 and 119 of the arrangement 100 can be conventional in design, consisting of an image sensor (or imager) defining an optical axis (OA described below) and a separate laser illuminator generates a plane LP of laser light that is characterized as a "structured" illumination source in that it generates a specific optical effect on the surface of the object under inspection. The projected laser light plane LP of each sensor 110, 112, 114, 116, 118 and 119 projects a respective line LL0-LL5 on a portion of the underlying object 130 that is imaged. The laser plane LP is oriented to reside in a plane at a non-parallel (acute) angle relative to the optical axis OA of the imager optics. In this manner, the image characterizes height deviations (variations in the local z-axis) on the surface as a relative offset between adjacent lines LL0-LL5—generally along the local y-axis direction where the x-axis represents the direction of extension of the line LL0-LL5 along the surface. Each 3D sensor 110, 112, 114, 116, 118 and 119 inherently defines its own local coordinate space. Note that this local coordinate space, associated with each 3D sensor, is potentially misaligned relative to the coordinate space of another one of the sensors, as the sensors may not be precisely mounted with respect to each other, or in a manner that is precisely known.

Notably, the calibration of each individual 3D sensor is significantly accurate in terms of the relationship between displacement of the projected laser line LL0-LL5 along the local x-axis versus the local y-axis and the relative height of the imaged surface along the local z-axis. In many implementations, such accuracy can be measured in the micron or sub-micron level. Hence, the system and method herein can rely upon this inherent accuracy in making certain assumptions that speed and simplify calibration of the 3D sensors with respect to a common coordinate space. In the depicted exemplary arrangement of FIG. 1, the common coordinate space 140 is defined in terms of x, y and z-axes to which the images of all sensors are calibrated—where (by way of example) the direction of motion $M_y$ is oriented along the y-axis of the coordinate space 140 and the x and z axes are orthogonal thereto. This allows the system to view a wide object that exceeds the FOV of a single 3D sensor.

Motion $M_y$ of the conveyor 130 can be tracked by a motion encoder within the conveyor/stage (or by another motion sensing device, including a visual motion sensor that tracks movement of features (e.g. tick marks on the conveyor) through the FOV of one or more 3D sensors.) The encoder signal (motion information) 158 can be used to control image acquisition such that successive lines of each image are acquired corresponding to a programmed physical motion increment, or can be used to label each line of each image with the absolute or incremental motion detected at the time of image acquisition. Image (links 168) acquired by the sensors 110, 112, 114, 116, 118 and 119 are provided to a vision process(or) 170. The processor 170 can be integrated in one or more of the sensor assemblies, or as depicted, can be located on a separate computing device 180 optionally having an appropriate user interface (e.g. mouse 182 and keyboard 184) and display functions (screen and/or touchscreen 186). The computing device 180 can comprise a server, PC, laptop, tablet, smartphone or purpose-built processing device, among other types of processors with associated memory, networking arrangements, data storage, etc., that should be clear to those of skill.

The vision system process(or) 170 can include a variety of functional software processes and modules. The processes/modules can include various vision tools 172, such as feature detectors (e.g. edge detectors, corner detectors, blob tools, etc.). These tools are used during calibration of the 3D sensors (described below) and also to identify and handle features on the object 120 during runtime operation. The vision system process(or) 170 further includes a calibration process(or) 174 that generates calibration parameters that allow the local coordinate spaces of the individual 3D sensors to be "stitched together" into a common coordinate space, based upon a calibration procedure described generally below. The calibration procedure can include a variety of sub-procedures and processes.

Note that the stitching together of images, while described with respect to the present embodiment, is optional in some or all of the steps of the procedure(s) described herein and that individual images can be processed by discrete ID finders and decoders (described further below) in various embodiments to derive ID code information on the object.

As also described below, the vision system process(or) 170 includes an ID finder module/process(or) 176, with one or more discrete ID finder(s), which carries out the various procedures of the system and method to locate and register a desired set of ID features on the object surface 122 in an acquired image. The vision system process(or) also includes an ID decoder module/process(or) 178, with one or more discrete decoder(s), which includes various software and/or hardware elements that allow a located ID in an image to be decoded to obtain useable data therefrom—for example, the ID decoder(s) can include a barcode reader or an OCR reader (or both). Providing image data relative to the ID in an appropriate form allows the ID decoder(s) in the module 178 to translate it into (e.g.) alphanumeric data that is employed by downstream processes—for example, logistics, inspection, inventory tracking, etc. It is expressly contemplated that the ID decoder module 178 can be instantiated in a remote processor or device (other than the processor that runs the ID finder(s) and other vision system tools) interconnected by appropriate links to the vision system process(or) 170. In such arrangements, the vision system process(or) according to the illustrative embodiment transfers image data containing found IDs to the processor that runs the ID decoder(s).

The mechanism for mounting the 3D sensors with respect to the imaged scene is highly variable. In an embodiment a rigid overlying beam is used. It is desirable to reduce or limit vibration, as such vibration can introduce inaccuracy to the calibrated system. Alternative mounting mechanisms and arrangements can be utilized depending on the requirements of a specific embodiment. For example, an array of sensors can be located below a gap between a pair of conveyors, in order to scan the bottom surface of an object, and/or to scan the surface of objects of varying thickness at a more constant distance relative to the sensor.

There are a variety of advantages to arranging a plurality of side-by-side sensors, all calibrated to a common coordinate space. In addition to the widening of the overall FOV, the use of a plurality of calibrated 3D sensors is to overcome occlusion induced by the sensing modality. By way of background, the exemplary, depicted displacement (3D) sensors 110, 112, 114, 116, 118 and 119 project structured illumination onto a scene and a camera observes that structured illumination on the scene. 3D measurements are computed via triangulation after determining which structured illumination point corresponds to each observed feature in the camera's acquired image. This triangulation requires that the camera be relatively distant from the illumination projection, so as to establish a baseline for the triangulation. The system may be unable to generate range measurements for portions of the object surface, either because the laser beam is occluded from reaching that portion of the surface, or the laser has illuminated the surface, but the line of sight from that portion of the surface to the camera is occluded. Multiple displacement sensors can be used to overcome such occlusions, but displacement sensor calibration is required in order to accurately compose data from multiple displacement sensors. Note that the term "calibration" as used herein can also be referred to as "field calibration" in that it is performed in a user's runtime system environment, rather than at the factory producing the 3D sensor(s). Hence, the side-to-side (along the x-axis) sensor arrangement of FIG. 1 is useful for overcoming side occlusion. In this example, both the camera and the laser plane (LP) projection illumination can be considered to be emanating from a single point. An off-centered object can, thus, occlude a portion of the scene. Multiple 3D sensors can be configured so that any point in the scene is observed from both directions, whereby two partially occluded local images from respective adjacent sensors are combined into a single complete, non-occluded image. Consequently, using multiple displacement sensors to view the scene from different perspectives/points of view can effectively overcome such side-to-side occlusion problems. In an optional implementation, front-to-back occlusion can be reduced/eliminated by locating a pair of sensors in a back-to-back arrangement along the y-axis (with at least one set of sensors also extended across the x-axis to enhance FOV). This arrangement allows each sensor to image a portion of an otherwise occluded object. Each partial image from respective sensors in the front-to-back arrangements is combined to derive a full image of the object similar to the stitching-together of images from side-to-side sensors.

Figure 2:
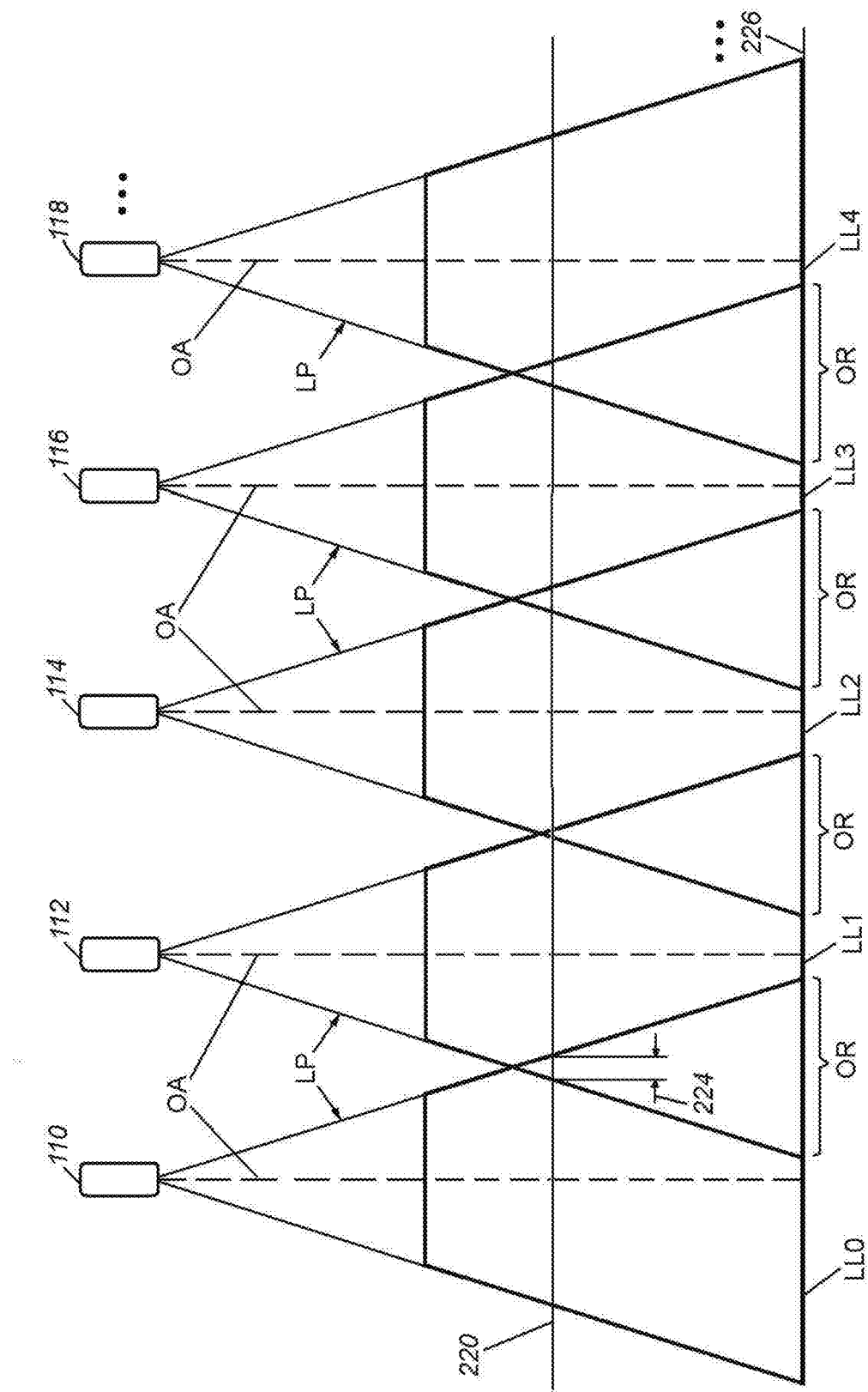
FIG. 2 is a front view of a plurality of sensors arranged with overlapping coverage as shown in the arrangement of multiple side-by-side mounted sensors in FIG. 1.

Notably, adjacent 3D sensors are mounted at an offset (at least) along the y-axis direction as indicated by the offset $Y_o$ (from dashed line 190) of sensors 110, 114 and 118 with respect to sensors 112, 116 and 119. This offset ensures that there is no cross-talk or interference between the laser lines of each sensor. Each sensor's image is acquired separately and, as described below, is subsequently stitched together during the calibration process. Likewise, it is contemplated that each projected laser line LL0-LL5, overlap at least one other line along the x-axis within their FOVs. This ensures that the entire surface of the object is fully imaged. As also described below, overlaps are aligned by the system and method during the stitching step. To further ensure that every portion of the object is viewed from both sides, thereby reducing opportunities for occlusion, FIG. 2 shows a frontal view of a series of overlapping laser planes LP for exemplary 3D sensors 110, 112, 114, 116 and 118, each with an optical axis OA. In the overlap areas OR, if a portion of the object surface is visible to one sensor, but occluded from another, then the stitching process employs the data from the sensor that is not occluded. For the portions of the surface that are visible to more than one sensor, there are multiple ways of resolving these measurements into a single value, including left to right and right to left priority, which is described in further detail below. Note that the upper end of the FOV 220 defines a minimal overlap distance 224 that is sufficient to address occlusion of one of the sensors. The overlap region OR is maximum at the bottom end 226 of the FOV (typically in the plane of the conveyor.

Note that crosstalk between adjacent 3D sensors can be avoided by other mechanisms—some of which can allow sensors to be mounted substantially free of offset ($Y_o$). For example, different-wavelength lasers can be projected in adjacent units coupled with narrowband filters on the associated sensor cameras/optics. Adjacent lasers with different polarizations and polarizing filters can be used in further embodiments. Additionally (or alternatively) the illumination controller(s) associated with each of the sensors can cause the respective, projected laser lines to be strobed in a synchronized manner such that each area where laser lines overlap can be imaged by the sensors while only the respective laser line associated with a given sensor is illuminated.

II. Calibration

Figure 3:
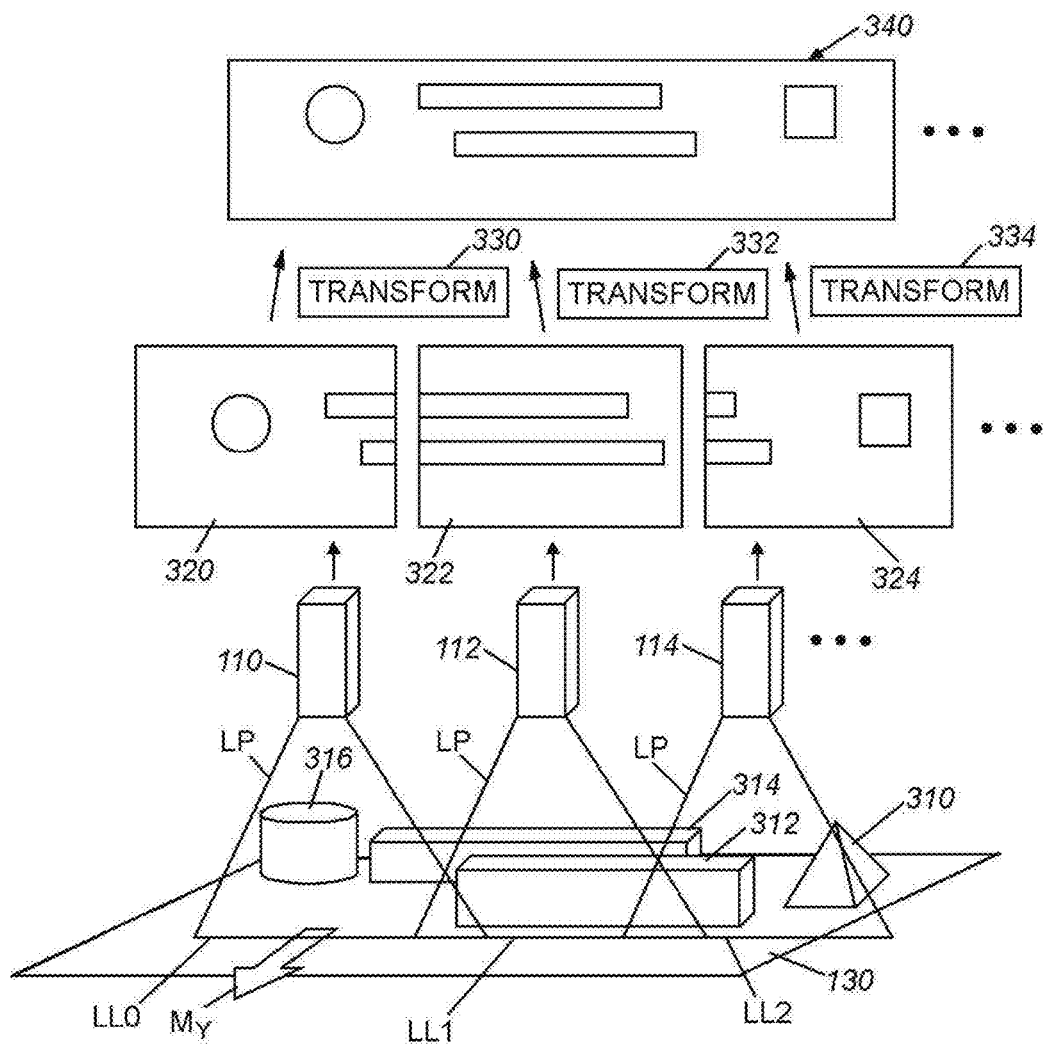
FIG. 3 is a diagram showing an embodiment that includes the stitching together of multiple 3D sensor images using the illustrative system and method herein.

The system and method of the illustrative embodiments herein employs calibration parameters that generate transforms so that image pixels acquired in each discrete 3D sensor's local coordinate space are transformed into a single common coordinate space. Any overlap between local images, once transformed to the common coordinate space, is blended (using techniques known to those of skill) to define a substantially seamless image, so that data residing between acquired local images is fully readable and can be rendered into grayscale or color renderings. The following is a description of the key elements, functions and procedure steps of the calibration technique by which calibration parameters and associated transforms are generated for use in the (typically) runtime system and method described herein. The calibration technique hereinbelow is described in detail in co-pending, commonly assigned U.S. patent application Ser. No. 14/936,616, entitled SYSTEM AND METHOD FOR CALIBRATING A PLURALITY OF 3D SENSORS WITH RESPECT TO A MOTION CONVEY- ANCE, filed Nov. 11, 2015, by Ruibing Wang, et al., the teaching's of which are incorporated herein by reference. Thus, with reference now to FIG. 3, the system and method particularly facilitates stitching of runtime image data from multiple 3D sensors (e.g. sensors 110, 112, 114) based upon the calibration process(or) 174 so as to define a single FOV and a common coordinate space. As shown, one or more object(s) 310, 312, 314 and 316 are moved (arrow $M_y$) with respect to the (partially depicted) set of sensors 110, 112 and 114, which project planes LP with overlapping (exemplary, depicted) laser lines LL0-LL2. In an embodiment, the exemplary, projected laser lines LL0-LL2 can be offset from each other as shown in FIG. 1 (and/or otherwise arranged/selectively filtered) to prevent crosstalk and other undesirable conditions, as described above. Each sensor 110, 112, 114 generates a respective image 320, 322, 324 of some, or a portion of, the object(s) 510, 512, 514 and 516 within its FOV in its local coordinate space. The calibration procedure generates a transform 330, 332, 334 that respectively transforms the coordinate space of each image 320, 322, 324 into a common coordinate space. The procedure also accounts for overlap between the images by blending overlap using (e.g.) techniques known to those of skill. The result is a stitched runtime image 340 in which the objects appear as part of a single, continuous FOV.

Figure 4:
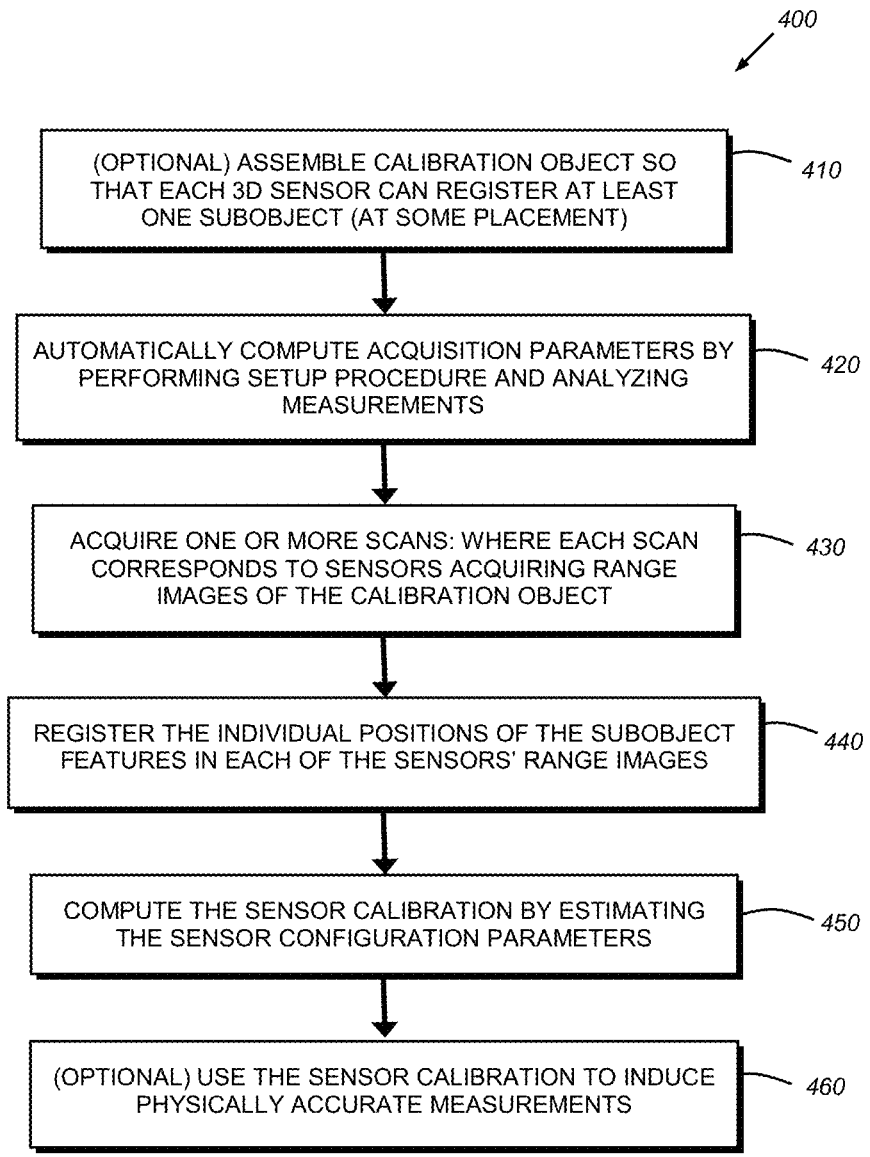
FIG. 4 is a flow diagram of a generalize procedure for calibrating a plurality of sensors to a common coordinate space for providing 3D images according to an illustrative embodiment.
Figure 5:
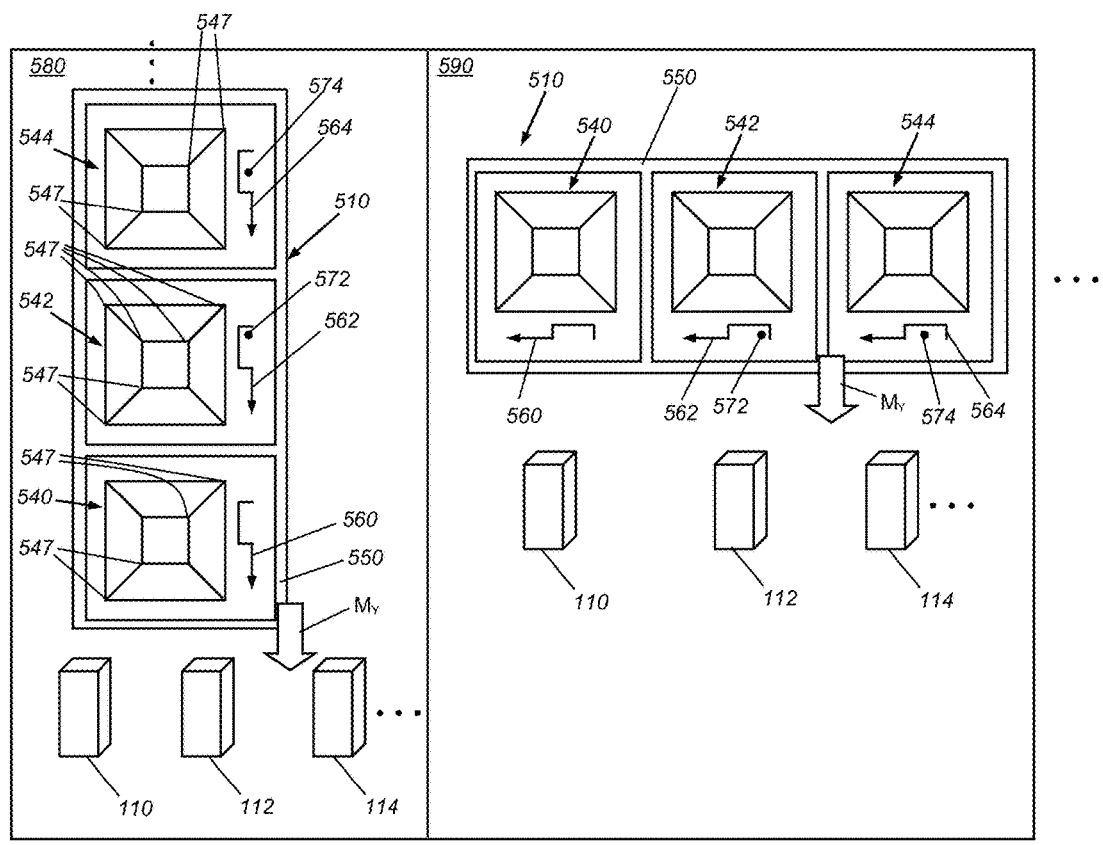
FIG. 5 is a diagram showing the construction of an exemplary 3D calibration object and its orientations with respect to the 3D sensors during a calibration process.

Calibration is accomplished according to the generalized calibration procedure 400 of FIG. 4 using a stable object, referred to generally herein as a "calibration object". With reference to step 410, a calibration object is optionally assembled by the user(s) in an optional initial procedure. The object 510 in FIG. 5 is a stable object (also generally termed herein as a "calibration object") consisting of a set of individual, spaced-apart calibration "subobjects" 540, 542 and 544 that each define a discrete "feature set" composed of intersecting planes and associated corners 547. In an embodiment, and by way of non-limiting example, each subobject defines a similar or identical frustum—a truncated four-sided pyramid. A frustum affords a convenient shape for a calibration subobject consisting of a plurality of identifiable surfaces and edges that generate features (e.g. corners) used in the calibration process. It is expressly contemplated that other forms of calibration subobject shapes—e.g. cones, irregular polyhedrons, etc. can be employed in alternate embodiments. The three exemplary subobjects 540, 542 and 544 (a partial set) are shown, corresponding to three (the partial) exemplary sensors 110, 112 and 114. Illustratively, a calibration subobject consisting of at least six subobjects corresponding to all six 3D sensors described above can be employed. The subobjects 540, 542 and 544 are separated by (e.g.) a planar region of the calibration object base plate or underlying base frame 550, which is typically free of 3D features (other than the side edges of the overall object). By "stable object", it is meant an object that remains rigid between uses so that its dimensions are predictable in each scan by the image sensors. The spacing between the individual subobjects is variable. In this embodiment, each frusta subobject 540, 542 and 544 is arranged on the base plate 550 to reside within the local FOV of one of the respective 3D sensors 110, 112 and 114. In an embodiment, each subobject is attached to an underlying plate or frame 550 in such a manner that the overall object exhibits minimal variation due to mechanical deflection (resulting from temperature variation, stresses, etc.). This mechanical isolation of system components to reduce variable deflection enhances the repeatability and accuracy of the calibration process. Notably, each subobject is constructed to define a predictable and accurate shape, but need not be identical or precisely constructed in view of the teachings of the illustrative system and method. Likewise, while it is desirable to orient all subobject assemblies in a relatively aligned arrangement on the underlying base plate 550, this is not required.

Referring again to the procedure 400 of FIG. 4, in step 420, the procedure automatically computes acquisition parameters by performing the illustrative setup procedure and analyzing measurements. By "automatic", it is meant that the setup is commanded by a user in a manner that minimizes the need for particular numerical or parametric input, rendering the setup and calibration process relatively "user-friendly" and free-of the need of significant knowledge or training. Such actions as computing parameters and transforms between coordinate spaces, identifying and measuring features on calibration objects, and the like, are desirably self-contained (and invisible to the user) within the algorithms/processes of the system. As described below, the system and method allows for straightforward operation by a user through navigation of a series of prompts on associated GUI screens.

In step 430 of procedure 400, the user arranges the calibration object in a manner that allows it to be "scanned" (i.e. imaged by the one or more of the sensor(s)) (note also that the terms "scanned" and "imaged" refer to being measured) during motion of the conveyance a collection of 3D (range) images acquired from one or more displacement sensors (where all of the acquisitions involve the same conveyance) in a plurality of orientations with respect to the FOV(s) of the sensor(s). Note that the scans can alternatively output generic 3D data, and are not limited to particular range images. In an alternate embodiment, the 3D sensor calibration process can acquire and employ 3D point cloud data, instead of 3D (range) image data. With reference again to FIG. 5, two separate scans 580 and 590 are depicted, each performed by the calibration procedure (step 530). In the first scan 580, one displacement sensor (e.g. sensor 112) views all of the calibration subobjects 540, 542 and 544 (i.e. the entire calibration object 510). This sensor identifies and registers/aligns features in each subobject in the first scan 580. Then, in the second scan 590, each displacement sensor 110, 112 and 114 images a respective calibration subobject 540, 542 and 544, and uses the registered features from the first scan to perform a calibration, including the stitching together of each sensor's coordinate space into a common coordinate space. Note that each subobject 540, 542, 544 includes a respective, unique (e.g. printed, engraved, peened, etched and/or raised) fiducial 560, 562, 564. These fiducials allow the system to identify and orient each subobject 540, 542 and 544 relative to the common coordinate space. As shown, the fiducial is geometrically patterned to positively orient the features in each frustum in the subobject. The fiducial can also define a unique shape or include (or omit as in fiducial 560) a uniquely positioned and/or shaped indicia (e.g. dots 572, 574 in respective fiducials 562 and 564). As shown, the dots are omitted and/or positioned at various locations along the length of the fiducial to define respective subobjects. Alternatively, (e.g.) unique numbers can be used to identify each subobject, which are recognized by appropriate vision tools during the scan(s). More generally, the calibration object and subobjects can include markings, which disambiguate the otherwise symmetric and substantially identical calibration subobjects. These markings also indicate the handedness of the calibration subobjects, as well as providing a mechanism by which the system can uniquely identify each subobject.

It is expressly contemplated that the measurement step(s) (i.e. the first "scan" herein) can be omitted in various embodiments where the measurements of 3D features are available from a data file—for example based upon factory-provided data for the calibration object and/or a coordinate measuring machine (CMM) based specification of the object. In such cases, the measurement data is provided to the calibration step described below for use in the concurrent calibration of the 3D sensors.

In step 440 of the procedure 400 (FIG. 4), the system concurrently registers individual positions of subobject features in each sensors' 3D image. In this example, the calibration subobjects include planar features, and the measured orientation of each plane can be used to generate the 3D coordinates of each point where three planes intersect. In this example, each plane is measured from 3D data corresponding to a specified region of the calibration object, and by way of further example, those specified regions can be arranged so as to include data from the planar region, and exclude data not part of the planar region, and also exclude data relatively distant from the frustum. Each exemplary four-sided pyramidal (frusta) subobject, thus, yields eight 3D points. Measurement of 3D points from planes is known to those of skill in the art and various processes, modules and tools are available to perform such functions on an acquired 3D (range) image. For example, such tools are available from Cognex Corporation of Natick, Mass. In an embodiment, the measured regions used to measure the planes (which are used to measure the 3D feature positions) are symmetric on the calibration subobject. This is so that the measured 3D feature positions are unbiased with respect to the presentation of the calibration subobject.

In calibration procedure step 450 of the procedure 400, the system computes the displacement sensor calibration (i.e. the "field calibration") for all sensors concurrently by estimating sensor configuration parameters. In optional step 460, the system can optionally employ the calibration to induce physically accurate measurements of the object under inspection/scan. One use for such measurements is to generate a rendered, physically accurate 3D (range) image that can include a grayscale representation of the object's 3D surface features. The rendering routine can take as input 3D point data, 3D faceted data, 3D (range) images (which characterize the Z height at each pixel location), or peak data, the native output of a displacement sensor before it has been transformed into physical coordinates. There are certain advantages to inputting the peak data, including minimizing the number of rendering steps because each rendering involves quantization (and, thereby, introduces quantization error), and that peak data allows a geometric heuristic to be employed which intentionally disregards artificial features. In an embodiment, four-way connected neighbors are decomposed into two triangular facets by characterized by the (e.g.) upper left, upper right, and lower left vertices and the upper right, lower left, and lower right vertices.

III. ID/Code Identification, Locating and Decoding

Figure 6:
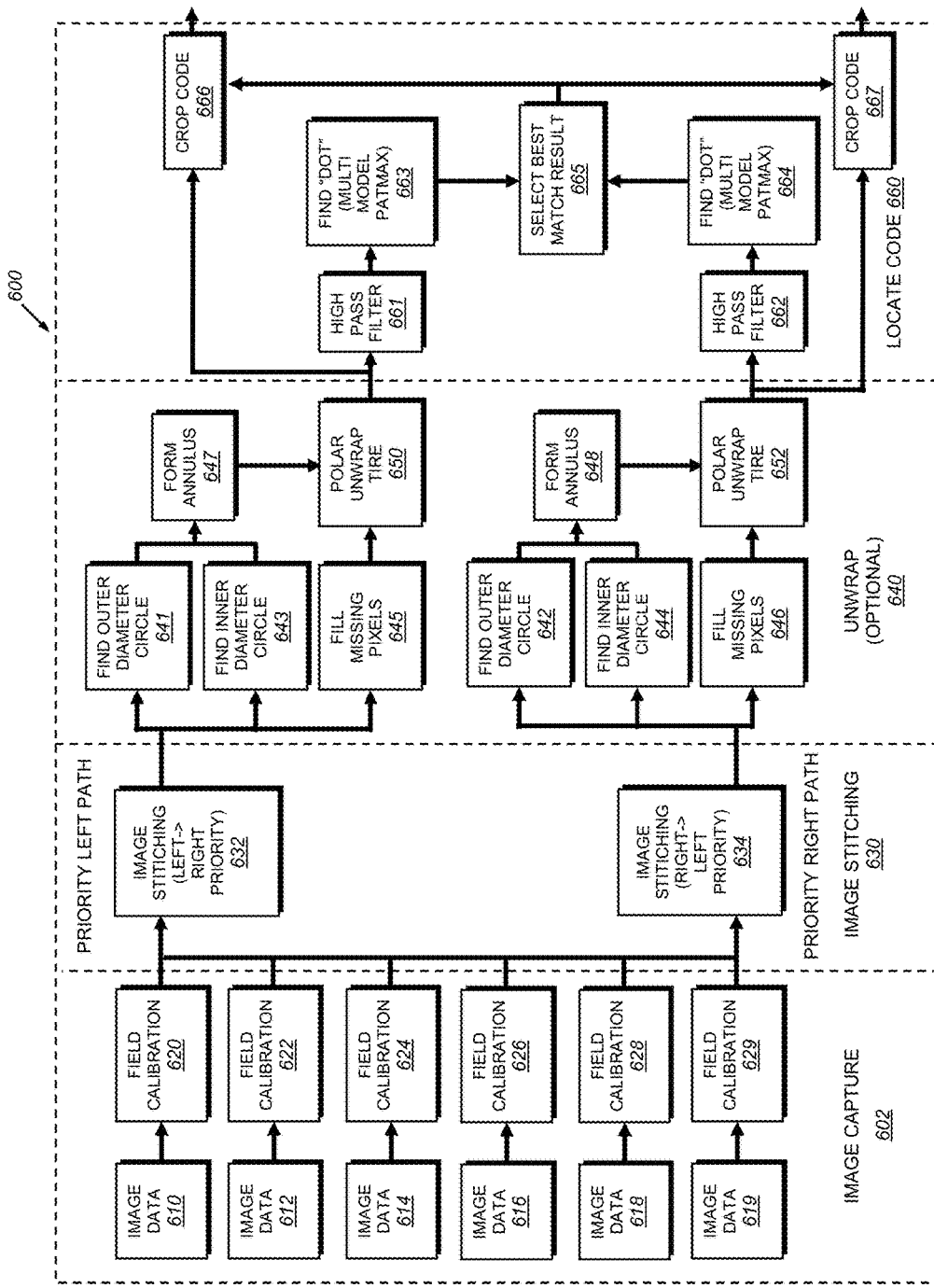
FIG. 6 is a flow diagram showing phases and steps of a procedure for finding and decoding IDs/codes on an object with the arrangement of 3D sensors as shown in FIG. 1, and in accordance with the system and method of the illustrative embodiment.
Figure 7:
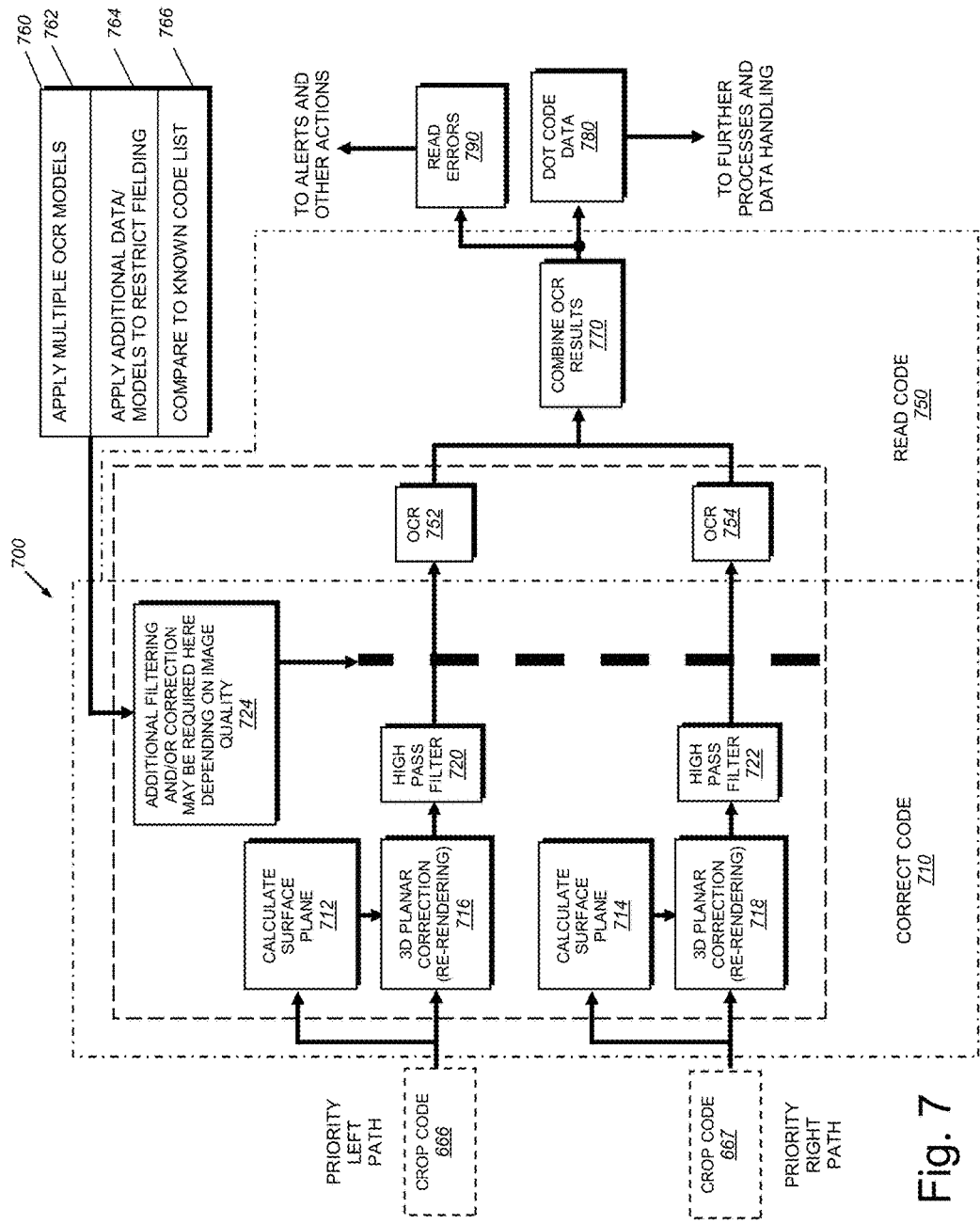
FIG. 7 is a further flow diagram of the phases and steps of the procedure of FIG. 6.
Figure 8:
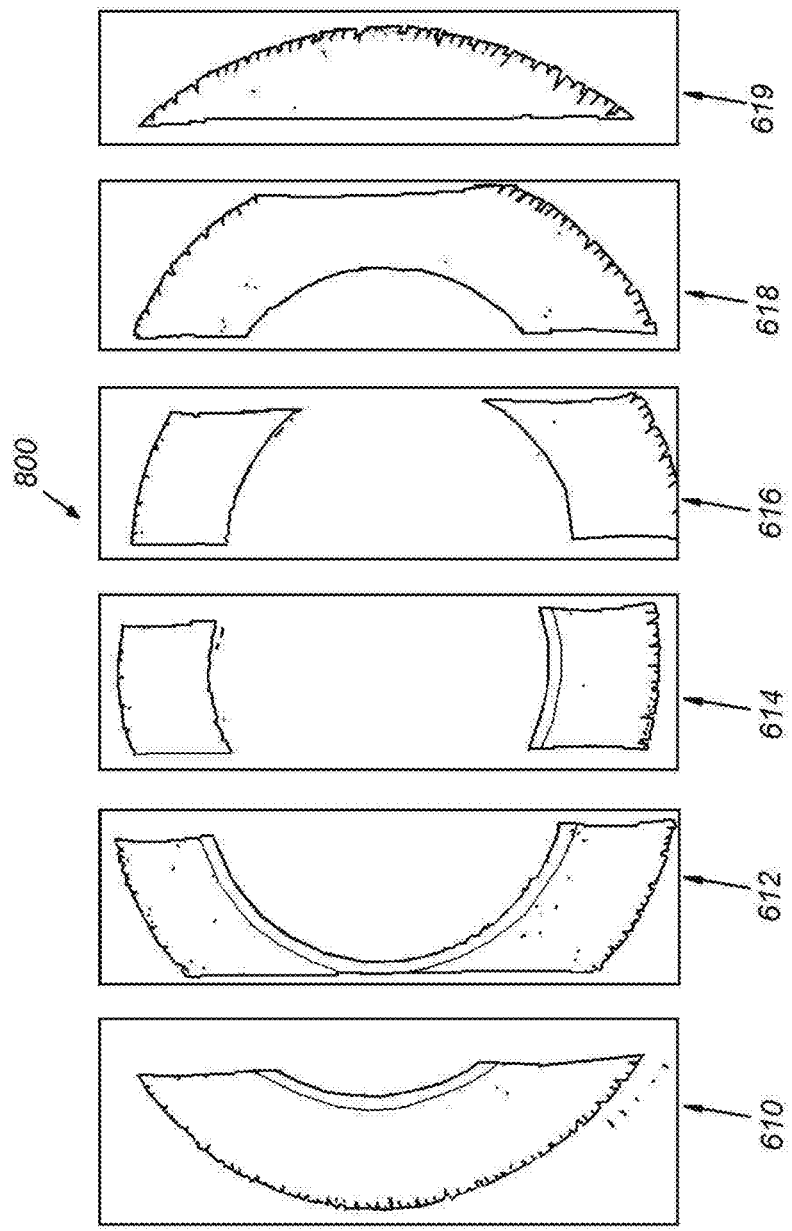
FIG. 8 is a diagram of a display of a plurality of exemplary 3D images respectively acquired/captured by each of the 3D sensors of FIG. 1.
Figure 9:
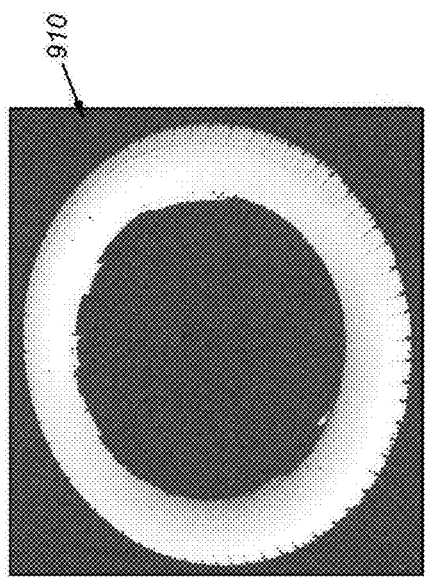
FIG. 9 is a diagram of a display of a stitched-together image of the exemplary images of FIG. 8.
Figure 10:
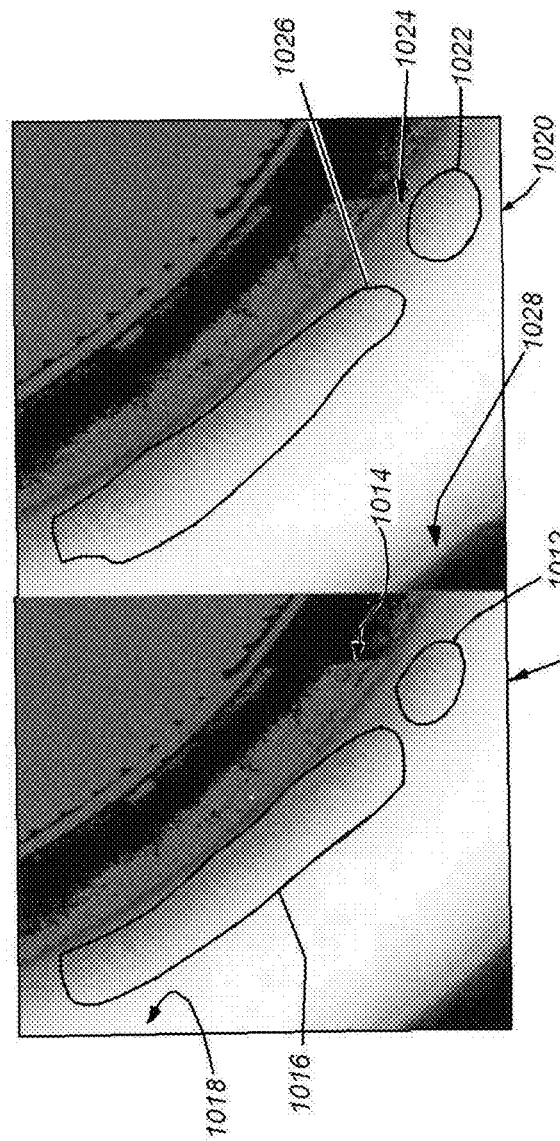
FIG. 10 is a diagram of a display of a portion of an exemplary stitched-together image of the exemplary images of FIG. 8, shown from a left-to-right priority and a right-to-left priority, respectively.

FIGS. 6 and 7 show the step functions in an ID/code-finding and decoding procedure 600 and 700 in accordance with an illustrative embodiment. The procedure 600 begins in an image capture phase 602 of runtime with the acquisition of one or more images and associated 3D (range) image data 610, 612, 614, 616, 618 and 619 of a scanned object by the respective 3D sensors 110, 112, 114, 116, 118 and 119 (FIG. 1). Representations of these captured images 610, 612, 614, 616, 618 and 619 are shown, by way of example in the display diagram 800 of FIG. 8. Note that each local image defines a slice of the overall object (e.g. a sidewall-oriented view of a tire). Each slice is characterized by overlap (i.e. along the FOV width or x-axis direction). Each set of 3D image data 610, 612, 614, 616, 618 and 619 is transformed into the common coordinate space using the respective calibration parameters 620, 622, 624, 626, 628 and 629 derived during the prior calibration phase described above. The calibration parameters allow the procedure 600 to stitch-together the images during an image stitching phase 630. It is contemplated that the images captured can be subjected to vibration due to uneven motion, conveyor surface variation and mechanical noise, which can result in small discontinuities in the resulting, acquired 3D image. Such small discontinuities are the result of calibrated x, y locations of a particular point in the range images of the scanned object within two adjacent sensors field's of view not exactly correlating to the same point on the physical surface of the object, or small discontinuities in the height measured for the same physical point on the surface of the scanned object by two adjacent sensors, or a combination of both. If such discontinuities are present in the region of the IDs or related features, then the overall read rate can be reduced or a failure to read the ID can occur. The image stitching procedure, thus, bifurcates stitching using the calibration parameters into two stitching processes 632 and 634 characterized by a stitching from left-to-right (priority left path) and a stitching from right-to-left (priority right path), respectively. This produces two discrete stitched images which differ in those regions where the field of view of adjacent sensors overlap. In one image the pixels in the overlap region are determined by values from the range image from the left-most sensor, and in the alternate image they are determined by the values from the right-most sensor. The overlap region is calculated, based on the distance from the scanned surface to the sensor and its known field of view, such that the width of the overlap region is at least as wide as the size of features to be analyzed. This guarantees that within at least one of the two discrete images the features to be analyzed appear entirely without interference caused by the discontinuities discussed previously. The later steps in the process detailed in FIGS. 6 and 7 are comprised of two identical processes (priority left path and priority right path) being conducted on each of the two images. Results from the two paths are combined at an intermediate point 665 where the location of the code is compared and at the end of the process 770 where the results of reading the code are compared and combined. A version of the stitched image 910 is shown in FIG. 9, constituting the entire tire, free of overlap or gaps in the representation. Similarly, a portion of a priority left path image 1010 and priority right path image 1020 are shown by way of example in FIG. 10. The left path image shows the presence of the letters "DOT" 1012 and 1022 (which define a fiducial for finding the remaining ID (depicted as letters 1016 and 1026 in each image 1010 and 1020, herein) for each image with respect to the slight discontinuities along the stitched boundary lines 1014, 1018 and 1024, 1028. Note that the boundary line 1014 is closer to the letters DOT (1012) in the image 1010 and the boundary line 1028 is closer to the ID in the image 1020. Likewise, the boundary line 1024 is further away from the "DOT" 1022 in image 1020 while the boundary line 1018 is further away from the ID in the image 1010. Hence, each image, priority left 1010 and priority right 1020 contains a more-readable version of certain aspects of the ID features as detailed previously, and in this example both are utilized to accurately locate and decode the desired data.

Figure 11:
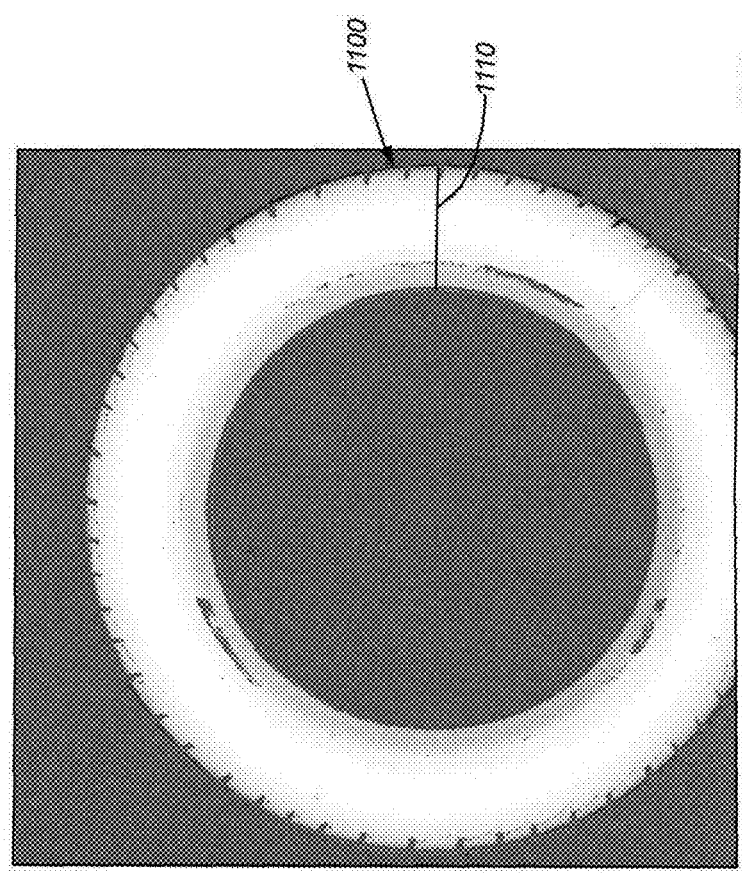
FIG. 11 is a diagram of a display of one of the exemplary stitched-together images of FIG. 10, showing the annular alignment of the image, with inner and outer circular edges.

The procedure 600 next provides the priority left and priority right stitched images from steps 632 and 634 to an unwrapping phase 640 that first locates the outer diameter circle (steps 641 and 642) and the inner diameter circle (steps 643 and 644) of the respective image. These are used to form a respective annulus region within the image (steps 647 and 648). This delineates the boundary of the feature-containing portion of the tire sidewall and ensures it will be included in the subsequent polar unwrap phase. Optionally, known information about the radial location of relevant features on the tire can be used to limit the radial range of the annulus region to be unwrapped. This provides a smaller working image for later steps as a way to improve overall speed and performance of the process. The annular representation is shown in the image 1100 of FIG. 11. In general, the representation can be defined in terms of polar coordinates based on a center and radius (note radius line 1110) with the inner and outer circles each having a radius value. The image is mapped between Cartesian (i.e. x, y) and polar coordinates in this phase.

Figure 12:
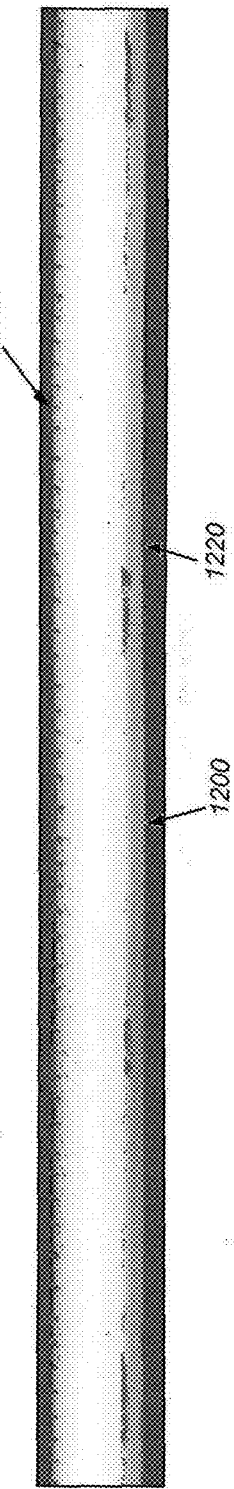
FIG. 12 is a diagram of a display of an optional polar unwrapped version of the alular image of FIG. 11.

The image data provided from the respective stitching steps 632 and 634 is also used to apply filtering and smoothing functions, thereby filling in missing pixels and reducing/removing spikes in the image in steps 645 and 646 (respectively). A variety of procedures, which should be clear to those of skill, can be employed to provide such filling and smoothing. For example averaging or median filters can be employed. The annulus representation (steps 647 and 648) is combined with the smoothing data (steps 645 and 646) to perform a polar unwrap procedure (steps 650 and 652, respectively) on each stitched image. In various embodiments, the filtering and smoothing functions can be performed in-part or entirely after the polar unwrap is performed, providing different levels and tradeoffs in terms of quality and execution times. FIG. 12 shows an exemplary representation of a polar-unwrapped image 1200 derived from the annular image 1100 of FIG. 11. Note that the outer annulus circle is now the top edge 1210 and the inner circle is now the inner edge 1220 of the unwrapped image 1200 and these edges are substantially parallel.

Note that the polar unwrap phase 640 is optional and can be omitted in alternate embodiments where the features to be located are not arranged in a generally circumferential arrangement, as contemplated herein in accordance with further embodiments. Additionally, it is contemplated that the processes by which the features are located and codes read can or may be made to work on directly on toroidal features.

Since the image data is in the form of an acquired 3D (range) image for each stitched image, the z-height information contained in each pixel can be used to calculate the general slope and/or curvature of the surface (common in (e.g.) a tire sidewall). This non-planar characteristic renders locating and reading IDs more challenging. Thus, in an ID/code finding/locating phase 660, each set of image data (from unwrap steps 650 and 652) is provided to a high pass filter step 661 and 662, respectively, in an ID or code locating phase 660. The high pass filter attenuates any slow-changing z-height features (change in z versus x and/or y)—such as curvature of the surface, and allows more rapidly (change in z versus x and/or y) changing surface features to be retained selectively within the resulting image. An exemplary filtered and unwrapped image 1310 is shown in FIG. 13. This is one of two exemplary versions of the image based on the two sets of priority left and priority right stitched data. Note that printing and other features on this image of the tire sidewall appear clearer and more readable. Note that a different rendering of the image (e.g. a grayscale rendering) can be processed to obtain the code contained therein based upon location information derived from the 3D image. Furthermore, a high-pass is only one such technique for refining an image herein.

Each filtered image (from filter steps 661 and 662) is provided to the vision system tools within the vision system processor so that predetermined features (e.g. a "DOT" lettering in U.S. tire production) can be located using (e.g.) conventional feature-finding techniques (steps 663 and 664, respectively). A variety of commercially available vision system tools and processes can be employed to assist in finding features. These tools can employ trained patterns of the features or a character-finding process. Training can be based on acquired images of actual models of the feature(s)-to-be-found or based upon a synthetic model of the features (or both). In this example Multi Model PatMax® available from Cognex Corporation of Natick, Mass. is employed to find the "DOT" lettering which can be used to determine the location of the associated DOT code. One rendition of this is shown in FIG. 14 and image 1400. The "DOT" ID 1410 and the associated information in adjacent ID characters 1420 are present. Note that the fiducial portion (e.g. "DOT") of the overall ID or code is illustrative of a wide range of possible features or fiducials that can be employed to locate the variable/readable portion of an ID or code. These features include logos or geometric shapes on the object (for example, an imprinted name) in addition to edge features. These allow the vision system to narrow down the search region and potentially focus on areas that are known to contain IDs on a predictable basis. Alternatively, the entire image can be subjected to ID-decoding (i.e. OCR).

In step 665, the ID/code locating phase of the procedure 600 selects the best matching result from each of the two finding steps 663 and 664. The matching process produces a score which indicates how closely the found feature matches a given model. The best of the scores produced in steps 663 and 664 is selected, and the location associated with that match is used in the subsequent steps of the process. Performing the search on both images guarantees that at least one image contains a complete and clear version of the matching feature. Given and overlap regions of sufficient width, the two priority modes guarantee that features of an appropriate size will appear in at least one image free of discontinuities as discussed previously.

Figure 15:
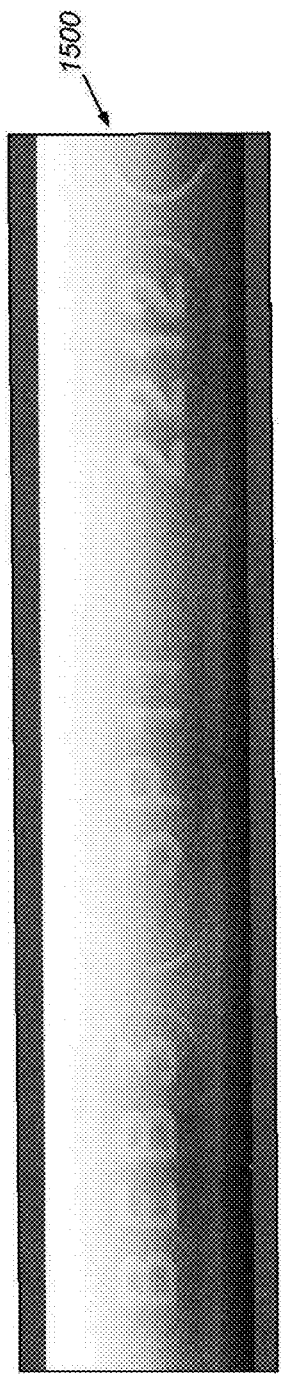
FIG. 15 is a diagram of a display cropped image of the readable (variable) portion of the ID found in FIG. 14.

In the ID/Code locating phase 660, the best matches are cropped into ID/code containing regions of sufficient size to ensure that the code is fully encompassed. In this embodiment, the characters of the ID or code of interest is located at a predetermined distance from the fixed, fiducial portion of the ID (e.g. "DOT") that allows the system to find the variable characters that are subsequently read to derive specific information relative to the tire (or other object). In this example, a rectangular region is defined (cropped) around the code in steps 666 and 667. This region is sufficient to ensure that the ID/code is fully contained, and illustratively it is a region free of other extraneous information that could complicate the reading and decoding process. The cropping region is drawn based upon knowledge of the relative orientation and spacing of the variable portion of the ID/Code versus the fiducial portion. As shown in the exemplary image 1500 of FIG. 15, the cropped region of the image contains only the variable ID/code portion (e.g. a string of alphanumeric characters) to be read by (e.g.) OCR.

Figure 16:
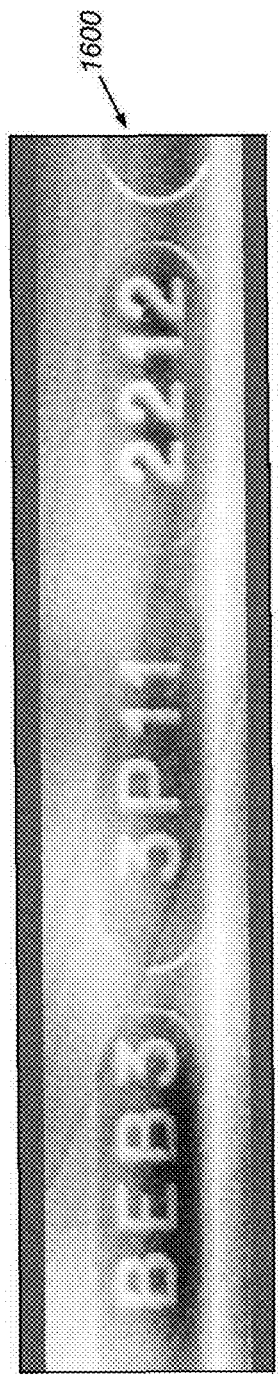
FIG. 16 is a diagram of a display of the cropped image of FIG. 15 with 3D planar re-rendering applied thereto.

Referring to the continuing ID/code-finding and decoding procedure 700, shown in FIG. 7, the cropped codes from steps 666 and 667 are provided to an ID/code-correction phase 710. Each cropped code is analyzed for z-height variation and a surface plane is calculated/fit to the cropped region in steps 712 and 714. If there is curvature present in the cropped region, then the process fits an approximate plane. The fitting of a plane to the given data can be performed in a number of ways known to one skilled in the art. The cropped image is re-rendered in respective steps 716 and 718 into a new coordinate system whose x and y axes reside in the plane and the z axis is a height normal to the plane. Through this process, the associated 3D features are transformed so that they are rendered as height differences from background and distortions due to tilt (non-normal viewing angle) are corrected. FIG. 16 shows an exemplary cropped image 1600 re-rendered from the original image 1500 of FIG. 15 to correct for tilt in the 3D planar orientation. The resulting image 1600 is clearer and more readable than the uncorrected image 1500.

Figure 17:
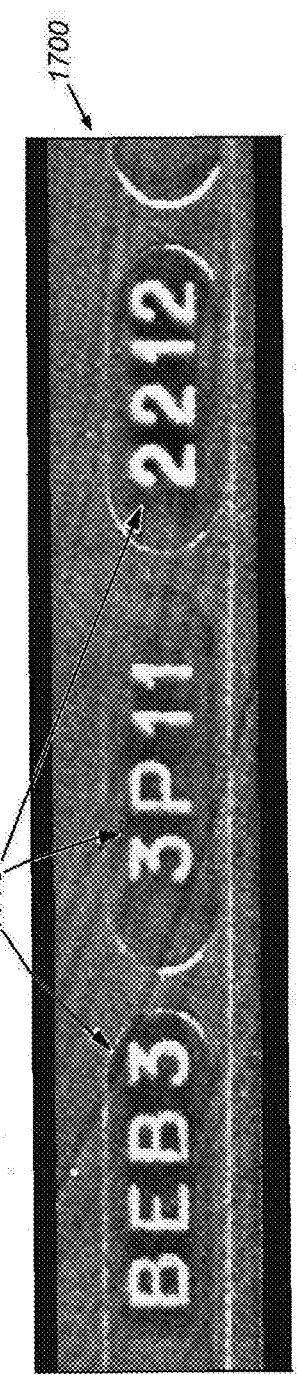
FIG. 17 is a diagram of a display of the cropped, planar-re-rendered image of FIG. 16 with high pass filtering applied thereto.

Next in the ID/code-correction phase 710, the planar-corrected images from steps 716 and 718 are provided to respective high pass filters in steps 720 and 722. The filters, again, attenuate slow-changing features in the cropped, planar-corrected to derive a more-clearly readable ID/code 1710 in the filtered image 1700 of FIG. 17. This removes any curvature which existed as a deviation from the flat plane corrected to in the previous step. Note, as indicated by block 724, additional filtering steps and/or image-handling/refining processes can be desirable to improve decoding (e.g. OCR). These processes can include, for example blurring or sharpening of the image, re-mapping of values to more strongly define particular value rages, or applying morphological operators to reduce noise or better define the features of the characters to be read. Note that the various filtering and smoothing process steps described herein can apply automatically-determined or default thresholds, or alternatively, a user can provide values to some or all of the filtering processes while monitoring the output results, and adjusting to make improvements thereto.

Figure 18:
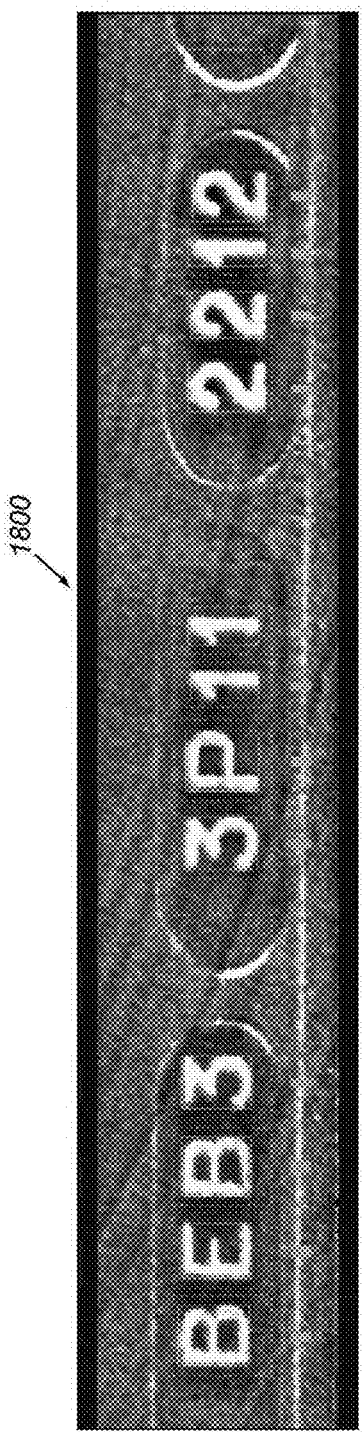
FIG. 18 is a diagram of a display of the filtered image of FIG. 17 in which the code characters are identified by an exemplary OCR procedure.

The filtered images are provided from respective filtering steps 720 and 722 (and any additional filtering processes/steps) to the ID/code-reading phase 750 of the procedure 700. In this embodiment, the decoding uses OCR functions and processes (steps 752 and 754, respectively) on each filtered image. FIG. 18 shows an image 1800 in which characters from the ID/code are identified and can be decoded. The two decoding (OCR) steps 752 and 754 operate to generate two discrete sets of decoded results each from the two respective images.

The OCR can operate in accordance with known processes. As indicated by block 760, in this embodiment, multiple OCR models can be employed to decode different ID/code fonts (sub-step 762). Also, additional data/models can be employed to restrict fielding on OCR based on known parameters associated with known IDs/codes. For example, known codes can be associated with a respective range of inner and/or outer diameters (sub-step 764). Optionally, if an OCR process produces multiple decode candidates for a given character, then a list of known codes can be checked to verify which codes from the candidates are potentially valid—thereby allowing the choices to be restricted and increasing the chances (and speed) in which a correct result is achieved (sub-step 766). In general results can be scored and those with the best scores can be used for further processing.

Figure 19:
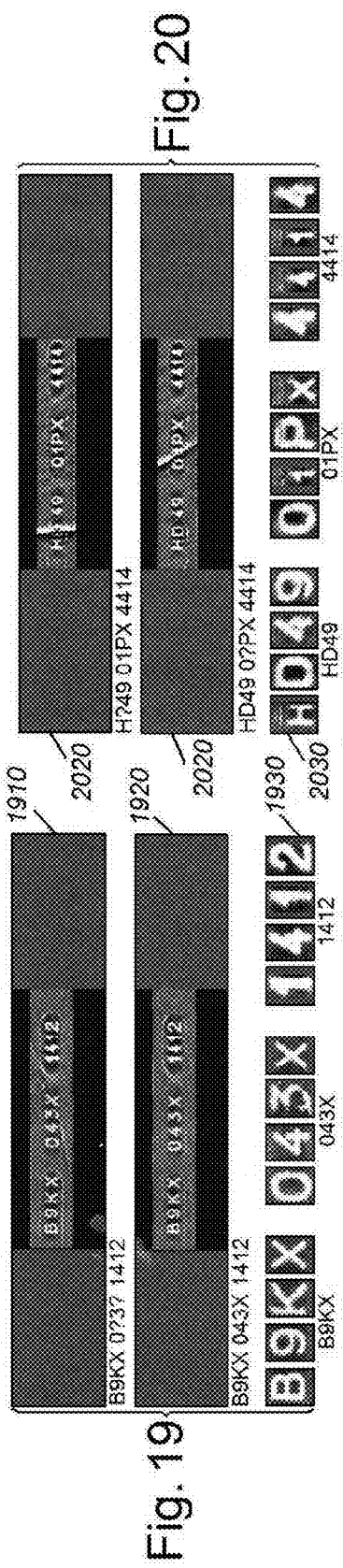
FIG. 19 is a diagram of a plurality of exemplary displayed images and associated OCR-read data showing the combination of a data set with a fully read ID/code and a data set with missing/unreadable characters in the ID/code to derive a complete set of read characters.

In step 770 of the ID/code reading phase 750 of the procedure 700, the OCR results from steps 752 and 754 (as modified or enhanced by the processes of block 760) are combined. This allows the procedure to potentially fill in missing information and/or verify correctness of any decoded characters by comparison of the two results. By way of example, FIG. 19 shows two decoded images 1910 and 1920 with the results of decoding listed directly below the image pane. Two of the characters (each indicated by "?") in the first image 1910 were not readily decodable (e.g. by OCR step 752 for the priority left path image data). The inability to decode is a result of the discontinuities in the stitched image due to non-ideal motion. Conversely, the characters are all readable for the second image 1920. Hence, the combination in step 770 yields a complete decoded data set 1930. This is output by the procedure 700 as ID/code data 780 that can be stored and/or transmitted to other downstream processes, including various data-handling devices.

Figure 20:
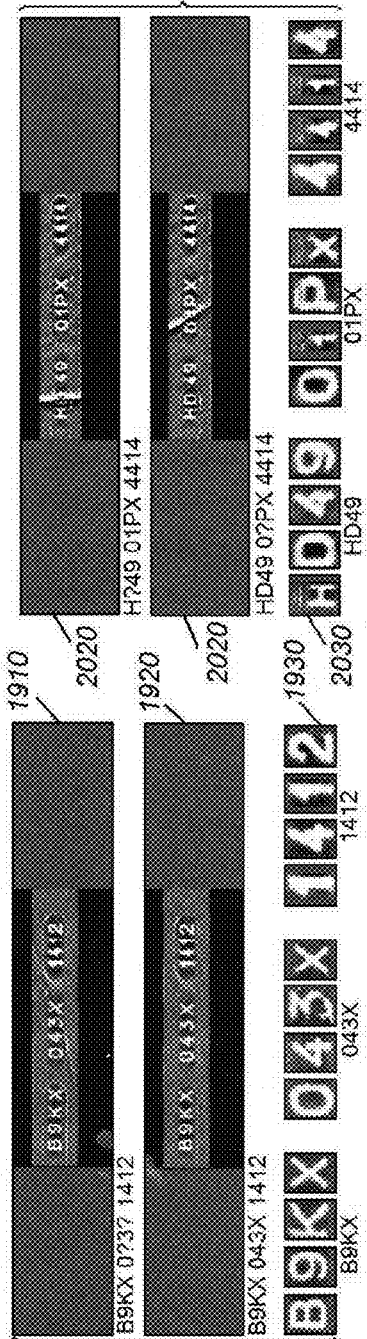
FIG. 20 is a diagram of a plurality of exemplary displayed images and associated OCR-read data showing the combination of data sets of two partially complete data sets of ID/code characters to derive a complete set of read characters.

FIG. 19 illustrates an example in which one of the IDs/codes is fully readable/decodable. FIG. 20 shows an example in which each image 2010 and 2020 contains unreadable characters. However, the unreadable characters in each image result differ from the other. The combination step combines the two results, selecting the best scoring characters at locations where both OCR steps 752 and 754 locate a readable character in their respective images, and combining those characters found at locations in only one of the respective images. This produces the complete result 780. Methods to select specific known possible codes if multiple decode candidates exist as described previously can be implemented at this stage as well. Should the process fail to achieve a readable result (for example some characters are still unreadable after combination and the remaining characters fit no known code), then a read error 790 can be indicated and other actions can be directed in response thereto. For example, the object can be flagged for further checks, rejected or a line stoppage can be instructed.

IV. Generalized Procedure for Image Processing and Decoding

Figure 21:
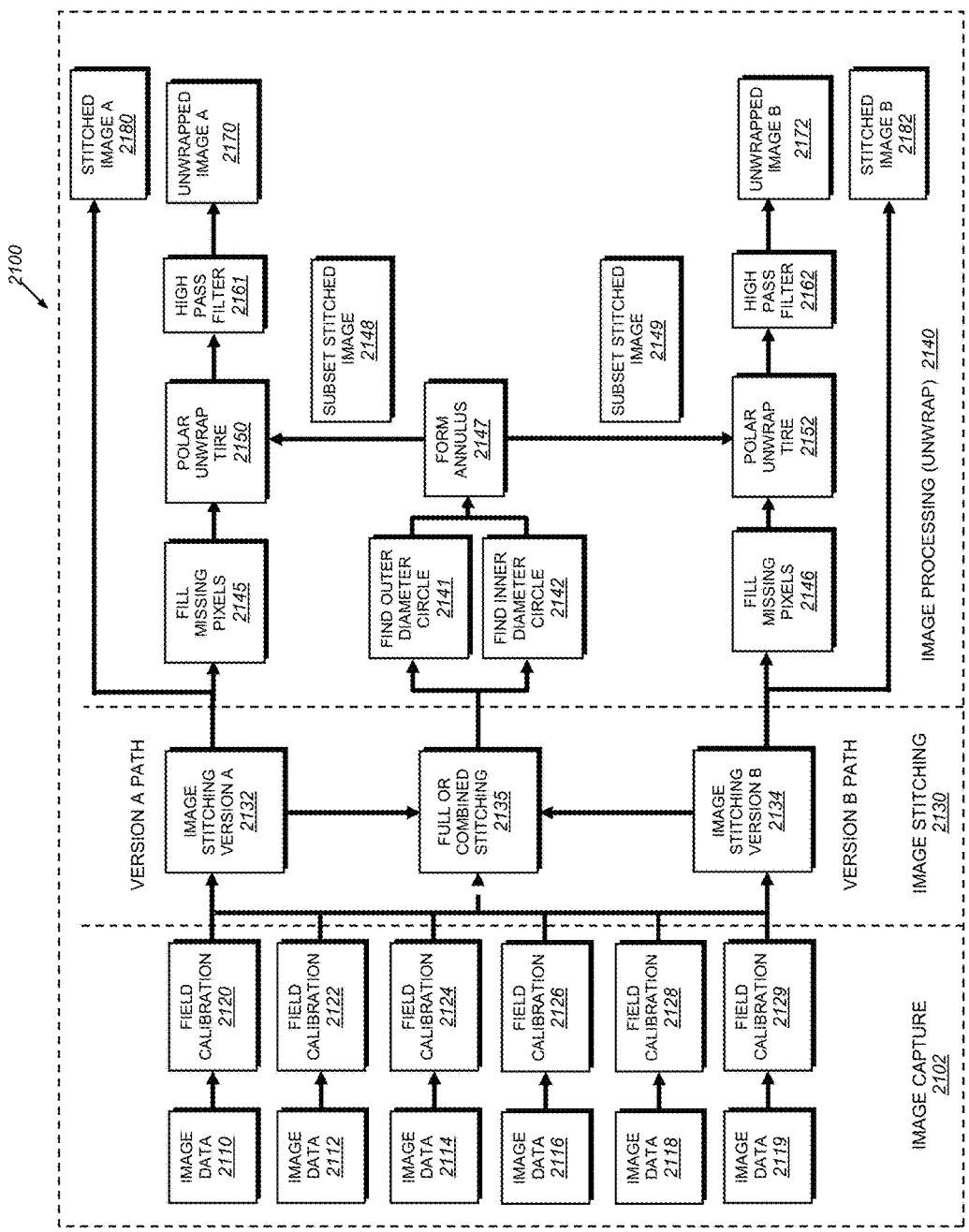
FIG. 21 flow diagram showing phases and steps of a more generalized procedure for finding, decoding and validating IDs/codes on an object with the arrangement of 3D sensors as shown in FIG. 1, and in accordance with the system and method of the illustrative embodiment.
Figure 22:
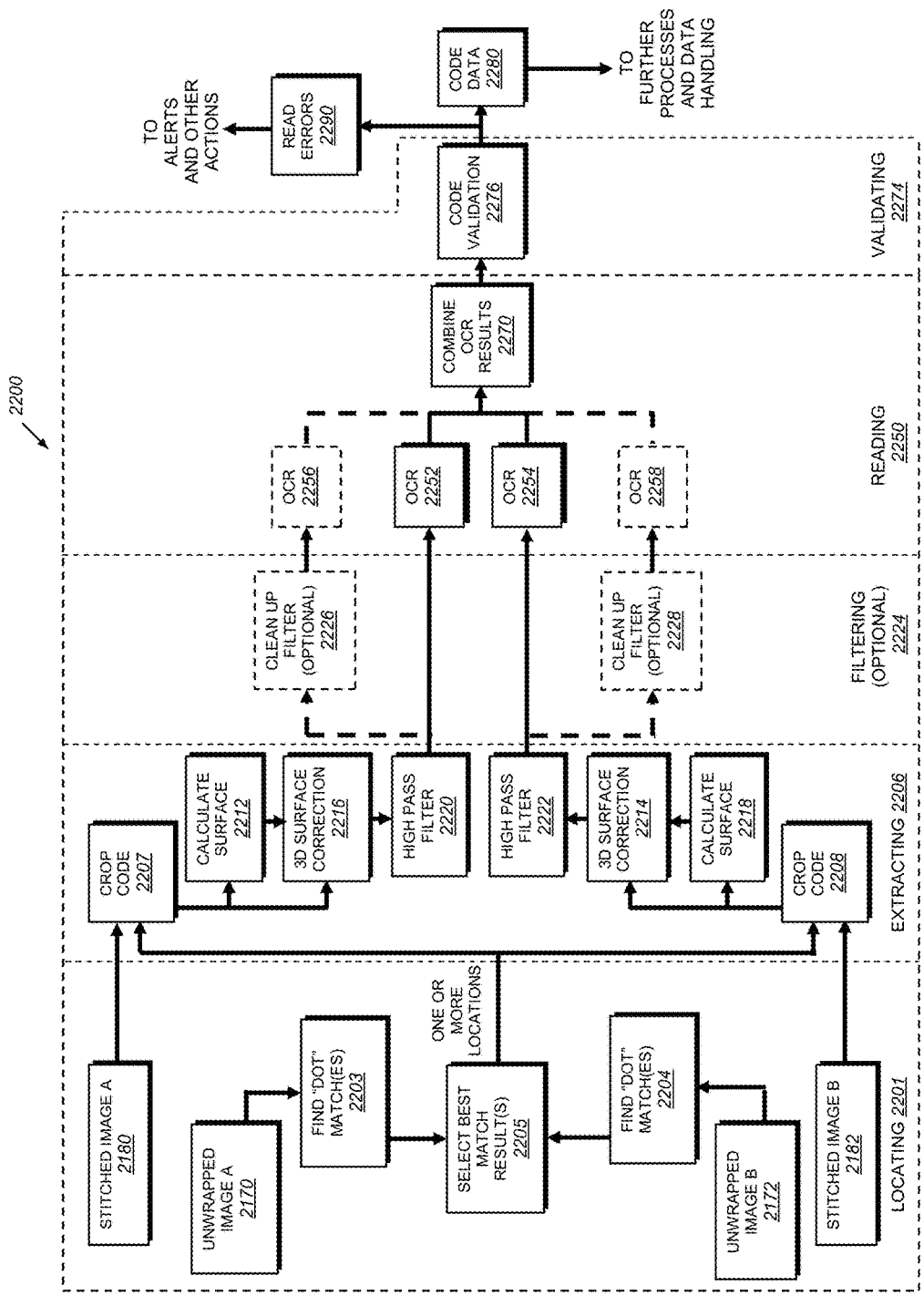
FIG. 22 is a further flow diagram of the phases and steps of the procedure of FIG. 21.

FIGS. 21 and 22 depict another procedure 2100 and 2200 (respectively) for finding and decoding IDs in a plurality of acquired images of a curved object. This procedure employs multiple versions of the acquired, stitched-together image that represent an organization of discrete images from respective 3D sensors such that each image contains a subset of the discreet images that do not overlap, as well as a fully stitched image use to find the annulus region of the tire. Where the steps in the procedure 2100 are substantially similar to those described above with reference to FIGS. 6 and 7, the following description should make reference to the more detailed description of such steps provided below.

In the image capture phase 2102, image data 2110, 2112, 2114, 2116, 2118 and 2119 is acquired by each of the sensors in the overall line of sensors described above. Each set of 3D image data 2110, 2112, 2114, 2116, 2118 and 2119 is transformed into the common coordinate space using the respective calibration parameters 2120, 2122, 2124, 2126, 2128 and 2129 derived during the prior calibration phase described above. The calibration parameters allow the procedure 2100 to stitch-together the images during an image stitching phase 2130. By way of non-limiting example, the stitching phase 2130 generates two versions A and B of the stitched image. Images produced in the A/B stitching process(es) can be comprised (e.g.) of a non-overlapping subset (with each subset consisting of only the odd or only the even sensors in the array). More than two images could also be generated, for example three versions A, B and C where each subset is every third image starting at the first, second, and third images respectively. The process performed on each image would be otherwise identical to that performed on the A/B image as illustrated, combining the OCR results from all three sources. An additional image comprised of the entire set of discrete images is also produced to be used for locating the annulus region of the tire. As only the location of the edge of the tire is relevant for the processes performed on this image the stitching method utilized can be the most expedient available, using either the discrete images or the stitched sub-set images. This stitching process can optionally involve down-sampling, reduction in image depth, or other processes to further reduce the total required processing time as long as such processing does not impact the general location and appearance of the tire edges beyond that required to determine the unwrap region with the necessary precision. Notably, this stitching approach resolves potential confusions caused by misalignments along the overlap boundary being read as a different character due to the misalignment—for example a lowercase "b" appearing more like an uppercase "P", due the a vertical shift in the right half of the character. Note that a more complete description of the various phases of the process can be found with reference to FIGS. 6 and 7 above where process steps are similar. Note also that in the present embodiment, the stitching process is performed in non-overlapping subsets the region of interest is also found in an additional fully stitched image.

In the procedure 2100 the image is thereby stitched in the stitching phase 2130 into version A 2132 and version B 2134 and the full stitched image 2135. Each version of the subset stitched images 2132, 2134 undergoes processing in the unwrap phase 2140 by a separate set of processing steps. The processing/unwrap phase 2140 locates the outer diameter circle (step 2141) and the inner diameter circle (step 2142) in the full stitched image 2135. These are used to form a respective annulus region (step 2147) within the subset stitched images 2148 and 2149 which shares a common coordinate system with the full stitched image 2135. The image data of versions A and B provided from the respective stitching steps 2132 and 2134 is also used to apply filtering and smoothing functions, thereby filling in missing pixels and reducing/removing spikes in the image in steps 2145 and 2146 (respectively). The annulus representation (step 2147) is combined with the smoothing data (steps 2145 and 2146) to perform a polar unwrap procedure (steps 2150 and 2152, respectively) on each version (A and B) of the image. Each set of image data (from unwrap steps 2150 and 2152) is provided to a high pass filter step 2161 and 2162, respectively. The processing phase 2140 thereby generates unwrapped image A 2170 and unwrapped image B 2172 that can be passed to subsequent steps along with the stitched image A 2180 and stitched image B 2182, respectively.

In FIG. 22, the ID Finding/locating phase 2201 receives versions A and B of the unwrapped image (2170, 2172) and stitched image (2180, 2182). Predetermined features (e.g. a "DOT" lettering in U.S. tire production) can be located using (e.g.) conventional feature-finding techniques (steps 2203 and 2204, respectively). The best match results from the A and B paths are selected in step 2205. These can consist of one or more locations on the object surface with ID information of interest, or which represent a potential locations for the ID information of interest, which is then passed to the extracting phase 2206. In this example, a rectangular region is defined such that it represents the area of the code relative to the feature used for location in the unwrapped images (2180 and 2182), then using the positional data from the selected match (step 2205) that rectangular region is transformed into the circular annulus section within the stitched images (2180 and 2182) that represents that same region prior to the transformation performed in unwrap step (2150, 2152). The code image is extracted (cropped) from the stitched images (2180 and 2182) and a polar unwrap procedure is performed on each annular region to produce an image of the code. Utilizing a second unwrap processes on the smaller code region from the stitched images (2180 and 2182) instead of extracting the code from the entire unwrapped images (2170, 2172) has the added benefit of reducing the effects of distortion caused by the polar unwrap processes which causes the a horizontal scaling distortion that varies along the resulting unwrapped image from top to bottom. Each cropped code can be analyzed for z-height variation and a surface plane is calculated/fit to the cropped region in steps 2212 and 2214. If there is curvature present in the cropped region, then the process fits an approximate plane. Over small portions of a curved surfaced such as the cropped code region, the deviation from an approximate plane is relatively minor, and correcting based on the plane removes the larger effects caused by the tilt of the surface. The fitting of a plane to the given data can be performed in a number of ways known to one skilled in the art. The plane generally defines a tilt angle and rotation within the common coordinate space. This tilt angle is used to re-render the cropped image. The cropped image is re-rendered in respective steps 2216 and 2218 into a new coordinate system whose x and y axes reside in the plane and the z axis is a height normal to the plane. Through this process, the associated 3D features are transformed so that they are rendered as height differences from background and distortions due to tilt (non-normal viewing angle) are corrected. The planar-corrected images from steps 2216 and 2218 are provided to respective high pass filters in steps 2220 and 2222. The filters, again, attenuate slow-changing features in the cropped, planar-corrected to derive a more-clearly readable ID/code. This removes any curvature which existed as a deviation from the flat plane corrected to in the previous step. Note, as indicated by phase 2224, additional "clean up" filtering steps and/or other image-handling/refining processes (steps 2226 and 2228, shown in phantom) can be desirable to improve decoding (e.g. OCR). These processes can include, for example blurring or sharpening of the image, re-mapping of values to more strongly define particular value rages, applying morphological operators to reduce noise or better define the features of the characters to be read, or selectively masking out regions or features based on shape of feature characteristics. Note that the various filtering and smoothing process steps described herein can apply automatically-determined or default thresholds, or alternatively, a user can provide values to some or all of the filtering processes while monitoring the output results, and adjusting to make improvements thereto.

The unfiltered and (optionally) filtered images are provided to the ID/code-reading phase 2250. In this embodiment, the decoding uses OCR functions and processes (steps 2252 and 2254, respectively) on each un-filtered code image, and optionally, OCR steps 2256 and 2258 (shown in phantom) on each filtered image, to decode character data from the images. The decoding (OCR) steps 2252 and 2254 (and optionally 2256 and 2258) operate to generate discrete sets of decoded results each from the respective images.

The OCR can operate in accordance with known processes. As described below with reference also to FIG. 23, OCR models can be employed to decode different ID/code fonts. Also, additional data/models can be employed to restrict fielding on OCR based on known parameters associated with known IDs/codes. For example, known codes can be associated with a respective range of inner and/or outer diameters. Optionally, if an OCR process produces multiple decode candidates for a given character, a list of known codes can be checked to verify which codes from the candidates are potentially valid—thereby allowing the choices to be restricted and increasing the chances (and speed) in which a correct result is achieved. In general results can be scored and those with the best scores can be used for further processing.

In step 2270 of the ID/code reading phase 2250, the OCR results from steps 2252 and 2254 (as modified or enhanced by the multiple code models) are combined. The combination may take into consideration the spatial relationships of the characters to combine the characters read in the multiple images, and may alter the score for combined characters based on the confidence in that character from the multiple images. The results are passed to an optional validation phase 2274 where code validation occurs in step 2276. Validation can comprise any acceptable mechanism, which should be clear to those of ordinary skill, for ensuring that the results of the decoding step are accurate. For example, the results can be compared to a table of known ID code combinations and if the code is valid then it is delivered as code data 2280 to further processes. If the code does not match such a known combination (or is generally found to be invalid), then it is flagged as a read error 2290, along with any errors from earlier stages of the process.

Figures 23, 24:
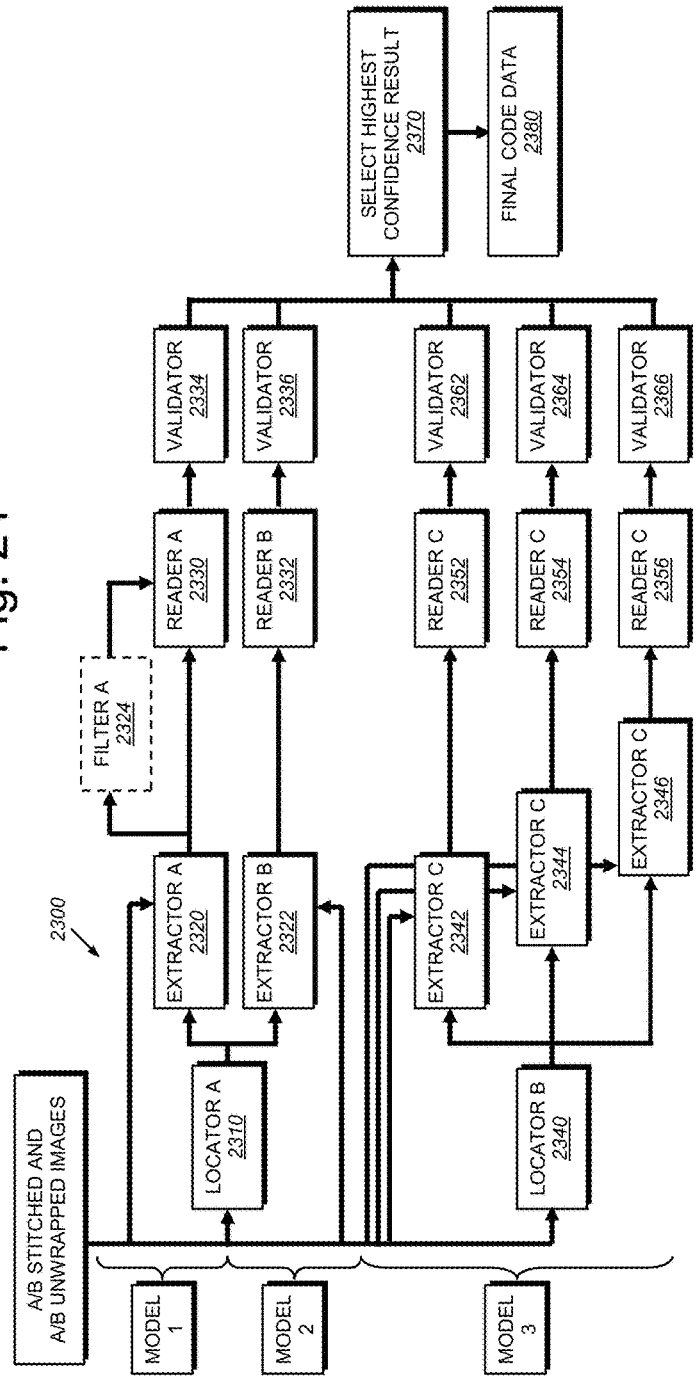
FIG. 23 is a flow diagram of a for finding, decoding and validating procedure using multiple code models to increasing system robustness and reduce errors.
FIG. 24 is a table showing three exemplary code models implemented in accordance with the flow diagram of FIG. 23.

By way of non-limiting example, validation can be accomplished based on finding the closest valid code to the code data read during the OCR process. The OCR process produces a set of positions, each representing the location of a possible decoded character. For each location, a set of characters and associated scores is produced based on a trained set of example characters. The scores represent the likelihood of the character at that position being that particular character. In a basic embodiment, the validation process can reject the lowest scoring character positions until the code is the maximum allowed length, and/or reject specially defined characters of the OCR font which represent features which appear similar to characters but are not in fact part of the code to be read. However this limited method does not address ambiguous or failed reads. Note that, in some fonts, similarly shaped characters, such as '8' and 'B', appear very similar and hard to disambiguate. This can cause scores to be very close and misreads may occur. Additionally signal noise, debris, and physically malformed characters may cause ambiguous or failed reads (where a failed read is detected as a position for a character, but the character at that position cannot be determined). To help correct in these ambiguous and failed cases, a validation processes can be performed against the known possible codes. Given that the set of known/used codes is a small fraction of the total space of possible codes, it is possible to determine which code the read code is closest to, and if close enough, correct the read code to that known code. This can be accomplished with a modified edit distance calculation with weighted costs which can be termed the "correction distance". The cost to swap from the best scoring character at a given position is the difference in the OCR scores between that best scoring character and the character being swapped to. The cost to delete a character position entirely is the difference in the cost of the best scoring character at that position, and the score of the $n^{th}$ best scoring character position, where n is one more than the maximum possible number of characters in a code. Direct insertion of data is disallowed, however character positions indicated by the OCR process which were not able to be matched to any possible character (failed reads), are allowed to be corrected to a character at some relatively high cost. Using these cost metrics the correction distance between the read code and the entire set of known codes is calculated. If the minimum correction distance is within some defined threshold, the read code is corrected to that known code. Additionally, requirements such as a maximum allowed cost for a single character swap, or a minimum distance between the minimum and second lowest correction distance can also be defined to further limit when a correction is allowed, and to define which characters should be reported, and how they should be reported, if the validation is beyond an acceptable correction distance FIGS. 23 and 24 define an exemplary multiple model approach to reading (e.g.) DOT codes. The table 2400 of FIG. 24 depicts three exemplary models 2410, 2412 and 2414, each composed of a set of parameters that are associated with a particular stage of the process 2100 and 2200 shown in FIGS. 21 and 22, respectively. The stages include locating 2420, extracting 2430, filtering 2440 and ID-reading 2450. With reference also to the flow diagram 2300 of FIG. 23 and by way of non-limiting example, there are shown two sets of locating parameters (Locator A and Locator B); three sets of extraction parameters (Extractor A, Extractor B, and Extractor C), one set of filtering processes/parameters (Filter A); and three sets of OCR reading parameters (Reader A, Reader B, and Reader C). As shown, these sets of parameters are organized into the three exemplary Models (1, 2 and 3). These models define different three possible appearances for the code, which vary in the feature being matched to find the code, the position of the code relative to that feature, and the font the code will appear in. Together these models describe the process taken to try to read the code in a single set of captured image data which may present the code in one of the three appearances as defined by the models. The flow diagram 2300 shows an exemplary operational procedure in which the parameters are executed in a sequence. Note that each "Locator" "Extractor" and "Filter" block in this diagram represents the processing of both the A and B paths described in the procedures (e.g. 2100 and 2200) above.

By way of example, in the procedure 2300, Models 1 and 2 use the same Locator A 2310, so the location process is run once with those parameters, and the results are reused. The two different Extractors (A and B) 2320 and 2322 produce different images to read even though the location result was identical between the two, as they define different regions relative to the located position. Model 1 produces an additional set of filtered images (via Filter A) 2324, then both models read with different readers Reader A 2330 and Reader B 2332, and the results are validated by Validators 2334 and 2336.

In the example of Model 3, a different Locator (Locator B 2340) is used, and for this set of images it finds three exemplary locations which may be the matched pattern. The subsequent extracting (Extractor C 2342, 2344, 2346), reading (Reader C 2352, 2354, 2356) and validating (Validator 2362, 2364, 2366) procedures are performed for all three possible locations derived by Locator B.

The validators (2334, 1225, 2362, 2364, 2366) can all represent the same processes and same set of known codes or other validation parameters as suggested by FIG. 23.

Alternatively the validator for each model may optionally employ different process or different validation parameters—if, for example, each model is associated with only a subset of the known codes which can be read.

This exemplary procedure 2300 thereby generates five possible results. A confidence for each result is calculated based on a combination or averaging of the scores produced during OCR process (step 2370). The result with the highest confidence is selected as the final code data 2380 to be delivered for subsequent use. Additional metrics may also be used to help determine the confidence of the results and select the best. It should be clear that the procedure 2300 and table 2400 represent one of a large variety of possible approaches to employing multiple models. The function and operation (e.g. algorithms employed) of the particular elements of the models L (Locators, Extractors, Filters and Readers, etc.) is highly variable in ways that should be clear to those of skill.

V. Level Triggering with Programmable Distance Offsets

Illustratively, it is desirable that the tire DOT code vision system arrangement can read (e.g.) tires of variable size with close spacing as they each pass under the sensor array. In an embodiment the array is adapted to capture an image approximately 40 inches long to image a complete 36-inch to 38-inch tire with some margin around the outer edge. A first exemplary tire passing through the vision system may be only 24 inches in diameter, while the subsequent, second tire may pass into the system with only a six-inch gap from the trailing edge of the first tire. Thus, the second tire would fall partially within the 40-inch field used to image the first tire—resulting in part of the second tire not being imaged. To avoid missing any portion of a tire and place a single tire per image it is desirable to provide variable-size image acquisition. In this manner, each image includes only one tire and a predetermined margin. Thus, a triggering arrangement and procedure that supports this desirable condition is provided herein. This arrangement and procedure is also adapted to handle various error conditions gracefully.

Figure 25:
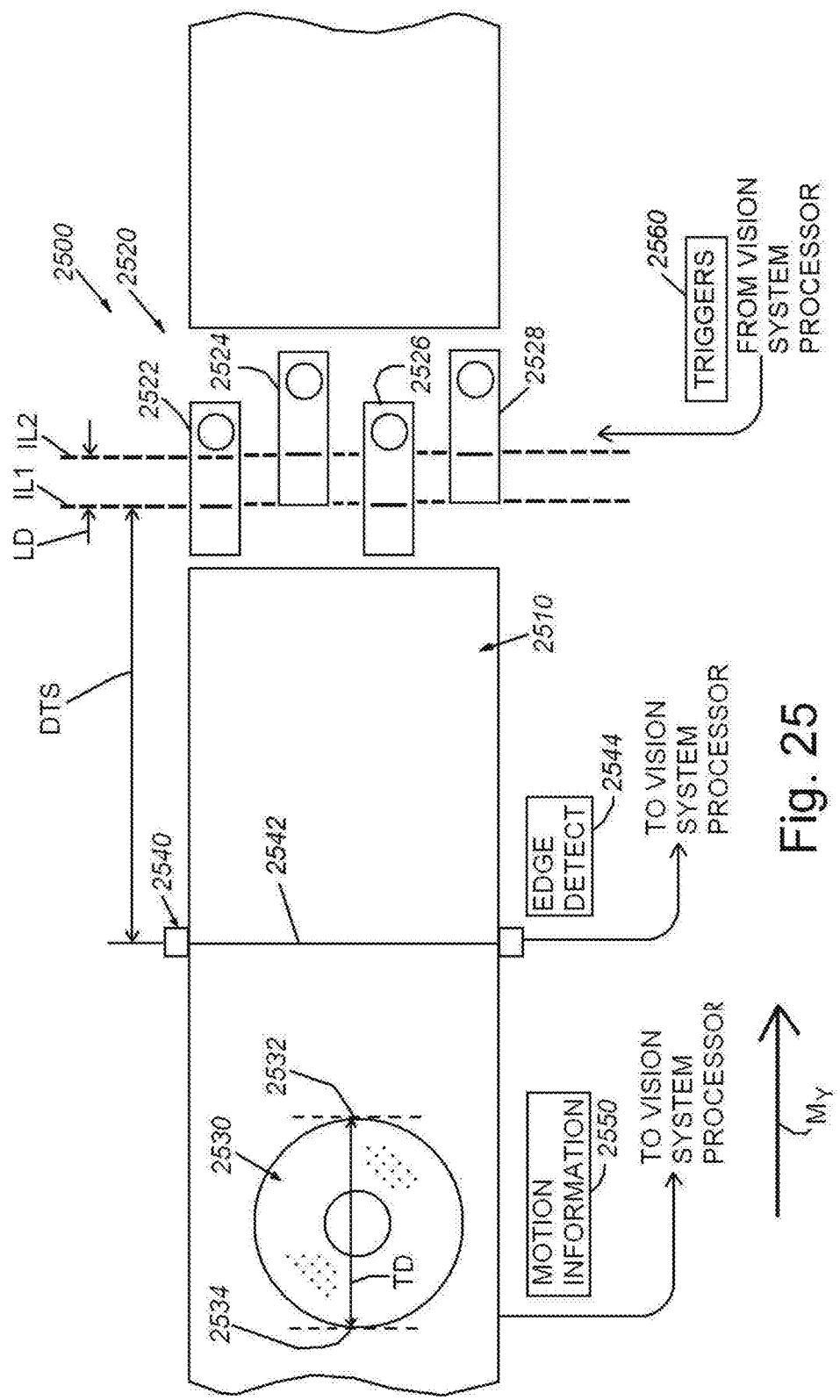
FIG. 25 is a diagram of a vision system arrangement for inspect objects (e.g. tires) on a conveyance in conjunction with an array of a plurality (e.g. four) of sensors 3D sensors, in which the object passes through a photosensor so as to trigger image acquisition in a manner that maintains a desired margin in the respective images of objects of various sizes.

Reference is made to FIG. 25, showing an exemplary inspection line 2500 with a conveyor 2510 and an exemplary 3D sensor array 2520 as described herein (consisting of four sensors 2522, 2524, 2526 and 2528 alternately staggered into each of two lines IL1 and IL2 represented by their associated laser planes (fans)). Each exemplary tire 2530 (with outer diameter TD between a leading edge 2532 and a trailing edge 2534) is directed downstream on the conveyor 2510 in a motion direction $M_y$ through a (e.g. conventional) photosensor arrangement 2540 that is upstream of the 3D sensor array 2520. The leading edge 2532 of the tire 2530 is sensed by a photosensor 2540 passing through the sensing line 2542. Edge/presence data 2544 is transmitted from the photosensor to the vision system processor and/or 3D sensors (as the processing of edge/presence sensing signals can be located within the sensor array or remote from it in various embodiments—illustratively signals are transmitted to the array from processing within the 3D sensors). The sensing line (and hence the detected leading edge) are located at a known distance DTS in advance of the 3D sensor laser plane line(s) IL1 and IL2 (which are separated from each other at a known distance LD). As described above, the 3D sensors are arranged in two rows staggered distance LD apart to avoid each lasers' interference with that of adjacent 3D sensors. As also described above, the conveyor 2510 includes an encoder or other motion sensing and measuring mechanism that sends motion information 2550 (e.g. encoder pulses of known distance) to the 3D sensors. The triggering logic (processor) present within the vision system processor or 3D sensors can compute when a leading edge 2532 of the tire moves from the photosensor line 2542 to the laser fan line IL1 and apply image acquisition triggers 2560 at the appropriate time. The details of how and when acquisition is triggered, and the duration thereof (based on the measured size of the object) are now described.

Figure 26:
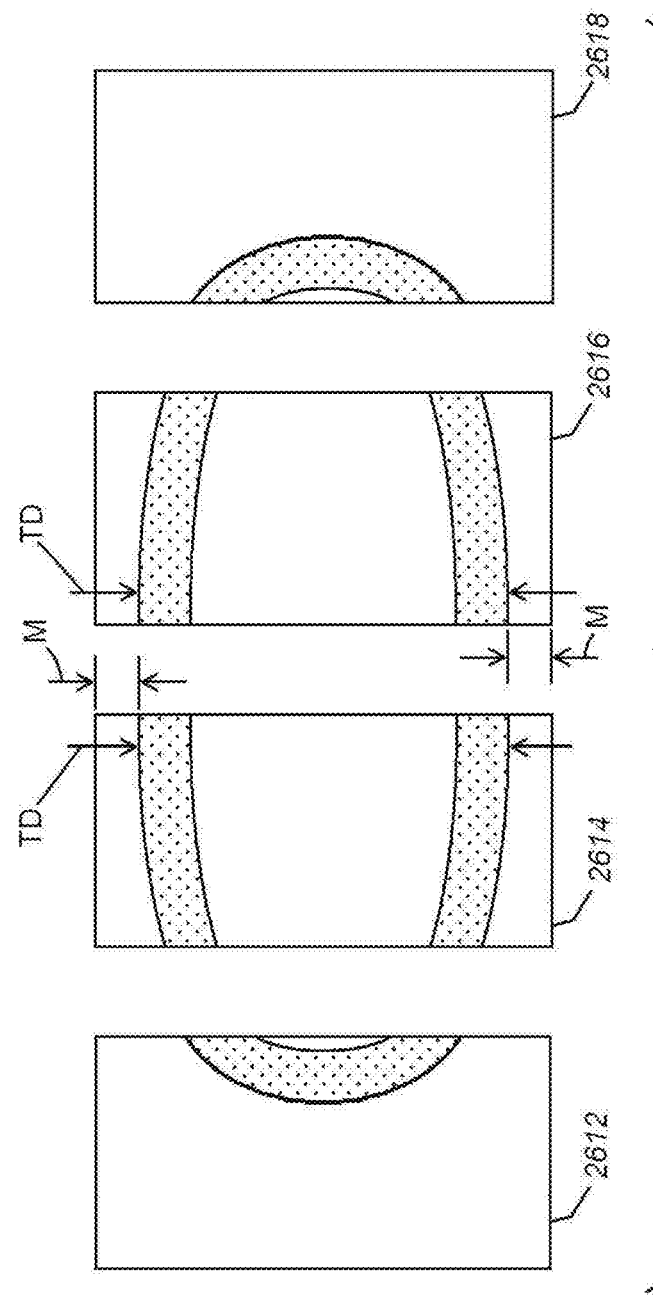
FIG. 26 is a diagram of a plurality of images generated, respectively, by each of the 3D sensors showing the desired margin M that the trigger process(or) of the arrangement of FIG. 24 computes around the image of the object.

With reference to FIG. 26, a plurality of discrete images 2612, 2614, 2616 and 2618 of the overall tire 2530 are shown, each acquired by one of the plurality of 3D sensors 2522, 2524, 2526 and 2528, respectively. The depicted distance M represents a desired leading edge and trailing edge margin on the images (i.e. central images 2614 and 2616) with the greatest distance of tire depicted therein. Desirably, the margin M is constant regardless of the actual size/diameter TD of the tire.

Thus, in an embodiment a level triggering mode is employed to trigger image acquisition for each tire. The level triggering mode starts acquisition StartDelay encoder counts (which measure distance) after the photosensor 2540 detects the leading edge 2532 and stops acquisition StopDelay after the trailing edge 2534. StartDelay and StopDelay are set to values equivalent to the distance DTS−M and the distance DTS+LD+M, respectively. The photosensor level indicating that a tire is present is asserted for a value of encoder counts equal to $T_{high}$ as the tire passes (where the leading edge of signal corresponds to the leading edge of tire). The photosensor level is deasserted for encoder counts equal to $T_{low}$ during each gap between tires on the conveyor. Notably, each tire will trigger acquisition by the vision system once for an image of the correct size, and there will be no missed triggers, if all the following constraints are satisfied:

(a) $T_{high}$>=StartDelay−StopDelay;
(b) $T_{low}$>=StopDelay−StartDelay;
(c) distance from any leading edge to next leading edge>=StartDelay; and
(d) distance from any trailing edge to next trailing edge>=StopDelay.

If any of those constraints are violated then there may be missed trigger events. Each rising edge of the photosensor level either generates a valid trigger or a missed trigger event. For example, if the system has been specified to have a minimum gap between tires of 6" but a second tire follows a first tire with a gap of only 2", it is likely that constraint (b) on $T_{low}$ is violated. In that case, the first tire is correctly acquired with surrounding margin in an image, and the second tire generates a missed trigger event and does not cause an image to be acquired.

Figure 27:
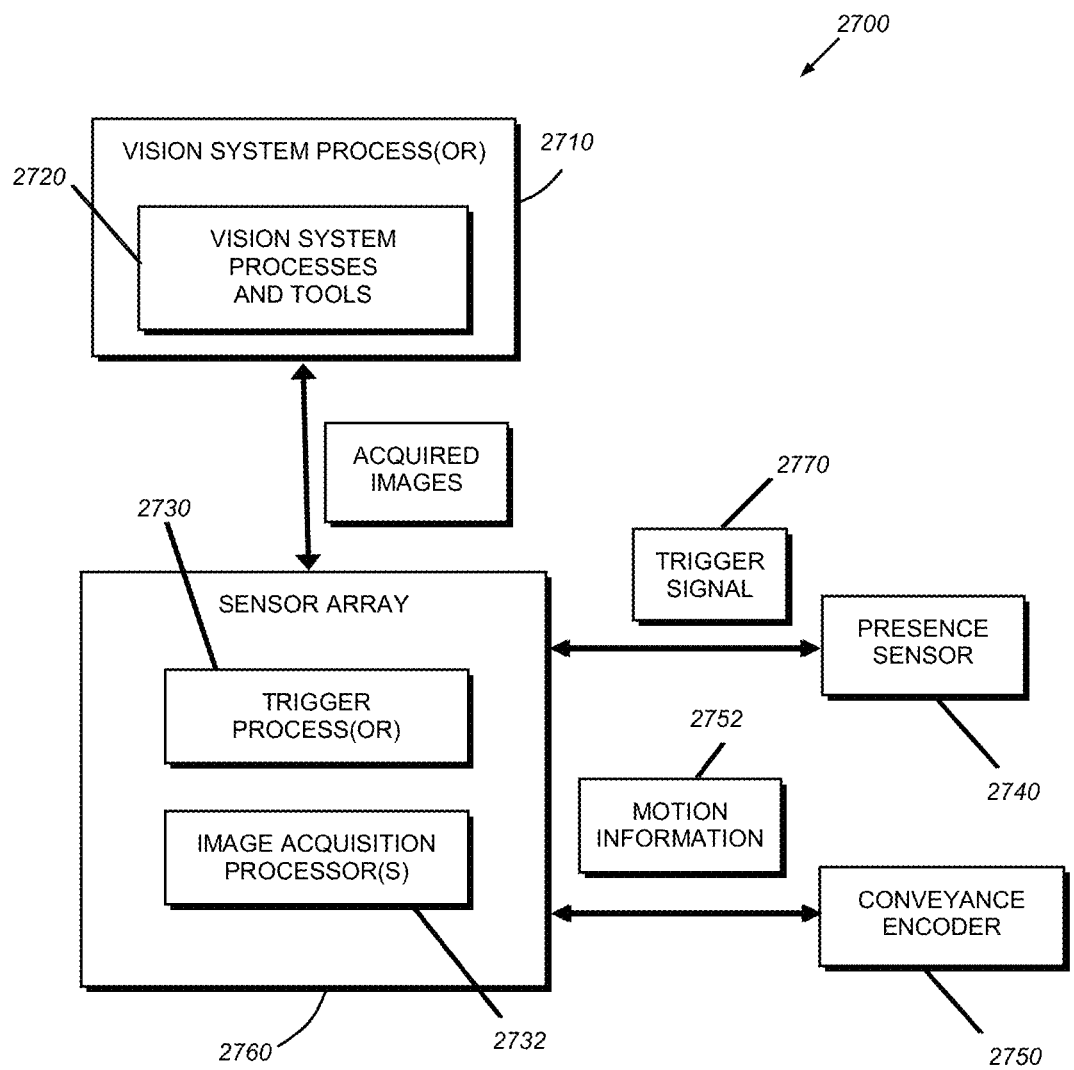
FIG. 27 is a block diagram showing a generalized vision system processor arrangement that includes a trigger process (or) for implementing the system and method of FIGS. 25 and 26.

Reference is made briefly to FIG. 27, which depicts a generalized vision system and processor arrangement 2700 in which a vision system process(or) 2710 for carrying out the operations described in FIGS. 25 and 26 above. The system/processor arrangement 2700 can be organized similarly to the processor 170 of FIG. 1. The illustrative vision system processor 2710, thus, includes various vision system processes and tools 2720 as described above and a trigger process(or) 2730 that receives input trigger signals 2770 from a remote presence sensor (a photosensor or photodetector) 2740 that represent a change in state at a detected edge of the object as it passes through the detection region (e.g. a light beam) of the photosensor 2740. The trigger process(or) 2730 also receives motion signals (e.g. encoder pulses) from the conveyance (encoder 2750) associated with the drive mechanism of the conveyance. These encoder pulses represent predetermined increments of conveyance motion and allow the trigger processor to determine the relative position of the edge of the object with respect to the photosensor 2740 and the sensor array 2760 (which is shown containing the processor arrangement 2710). As described above, the input information from the photosensor 2740 and encoder 2750 is used to compute the appropriate timing of image acquisition by each discrete sensor's acquisition process(or) 2762.

It should be recognized that the above-described example utilizes objects-under-inspection in the form of tires. However, the principles described herein are applicable to a wide range of objects that contain a detectable leading edge and trailing edge. The type of presence detector used is highly variable. In alternate embodiments, a mechanical presence detector can be substituted for an optoelectronic detector, or another active or passive detection modality (e.g. sonar, radar, etc.) can employed.

VI. Conclusion

It should be clear that the above described system and method provides a highly effective technique for finding and decoding IDs, including codes and characters on an curved, annular and/or toroidal object that expands across a potentially large FOV, typically larger than the FOV of a single 3D sensor, and potentially larger than the FOV of a multiplicity of side-by-side-mounted 3D sensors. The system and method allows for finding and decoding difficult-to read, raised or embedded characters and can operate in an environment in which some degree of vibration exists. The system and method also allows for variably sized objects to follow each other on a scan line (conveyor) with a minimal gap based on a triggering arrangement and procedure that senses the size of each object, and adapts thereto.

The foregoing has been a detailed description of illustrative embodiments of the invention. Various modifications and additions can be made without departing from the spirit and scope of this invention. Features of each of the various embodiments described above may be combined with features of other described embodiments as appropriate in order to provide a multiplicity of feature combinations in associated new embodiments. Furthermore, while the foregoing describes a number of separate embodiments of the apparatus and method of the present invention, what has been described herein is merely illustrative of the application of the principles of the present invention. For example, as used herein the terms "process" and/or "processor" should be taken broadly to include a variety of electronic hardware and/or software based functions and components (and can alternatively be termed functional "modules" or "elements"). Moreover, a depicted process or processor can be combined with other processes and/or processors or divided into various sub-processes or processors. Such sub-processes and/or sub-processors can be variously combined according to embodiments herein. Likewise, it is expressly contemplated that any function, process and/or processor herein can be implemented using electronic hardware, software consisting of a non-transitory computer-readable medium of program instructions, or a combination of hardware and software. Additionally, as used herein various directional and dispositional terms such as "vertical", "horizontal", "up", "down", "bottom", "top", "side", "front", "rear", "left", "right", and the like, are used only as relative conventions and not as absolute directions/dispositions with respect to a fixed coordinate space, such as the acting direction of gravity. Additionally, where the term "substantially" or "approximately" is employed with respect to a given measurement, value or characteristic, it refers to a quantity that is within a normal operating range to achieve desired results, but that includes some variability due to inherent inaccuracy and error within the allowed tolerances of the system (e.g. 1-5 percent). By way of further example, where relative motion is described, it can refer to exclusively moving objects, exclusively moving image sensors or both moving objects and moving image sensors. Thus, in certain implementation relative motion can be a predictable rotational motion, such as objects positioned on a moving carousel. Accordingly, this description is meant to be taken only by way of example, and not to otherwise limit the scope of this invention.

What is claimed is:

1. A system for reading and decoding ID features located on a surface of a curved, sloped and/or annular object:
   a plurality of 3D sensors, operatively connected to a vision system processor, calibrated by calibration parameters to generate a stitched-together 3D image of a field of view in a common coordinate space;
   a motion conveyance that causes the object and the 3D sensors to move in relative motion, the conveyance providing motion information to the vision system processor; and
   an ID finder assembly that locates ID features within a version of the 3D image, the ID finder assembly comprising one or more discrete ID finder modules.

2. The system as set forth in claim 1 further comprising an ID decoder assembly that decodes the ID features into decoded information, the ID decoder assembly comprising one or more discrete ID Decoder modules.

3. The system as set forth in claim 1 wherein the ID finder assembly defines a region around the ID features relative to the surface.

4. The system as set forth in claim 3 wherein the region is defined based upon predetermined features on the surface that have a known position with respect to the ID features.

5. The system as set forth in claim 4 wherein at least one of the predetermined features and the ID features define alphanumeric characters.

6. The system as set forth in claim 5 wherein the characters define the letters DOT.

7. The system as set forth in claim 1 wherein the image is polar-unwrapped to provide a linear image of the annular surface.

8. The system as set forth in claim 7 wherein the ID finder filters the surface to reduce the effect of surface curvature.

9. The system as set forth in claim 8 further comprising a filtering module that removes missing pixels and spikes in an image based upon the 3D image.

10. The system as set forth in claim 1 further comprising an image re-renderer that defines a region on the surface around the ID features in the 3D image, and that determines a fit plane and relative orientation of the plane with respect to the coordinate space, the image re-renderer transforming the image into a re-rendered image such that the fit plane aligns with the x-y plane, reducing perspective distortion in the image.

11. The system as set forth in claim 1 wherein the 3D sensors comprise laser displacement sensors that project laser lines onto the object.

12. The system as set forth in claim 11 wherein the laser lines overlap in a direction orthogonal to a conveyance motion direction.

13. The system as set forth in claim 12 wherein the overlap is sufficient to image the ID features fully in each of adjacent 3D sensors.

14. The system as set forth in claim 11 wherein each of the laser lines is offset from adjacent of the laser lines along the conveyance motion direction.

15. The system as set forth in claim 11 wherein the laser lines are strobed in a synchronized manner such that each area where laser lines overlap can be imaged by the sensors while only the laser line associated with a given sensor is active.

16. The system as set forth in claim 1 wherein there are at least two versions of the stitched-together image in which either: (a) a first of the versions is provided using values from the left-most sensor in those areas where the two sensors images overlap, and a second of the versions is provided using the values from the right-most sensor or (b) multiple versions are provided respectively containing a non-overlapping set of the discrete images generated by each sensor.

17. The system as set forth in claim 16 wherein the multiple versions comprise two versions, and wherein a first of the two versions comprises values from one or more odd-numbered sensors in an array of a plurality of the sensors, and a second of the versions comprises values from one or more even-numbered sensors in the array of the plurality of the sensors, each of the two versions being decoded by an ID decoder.

18. The system as set forth in claim 17 wherein ID location is performed on results from each of the version and compared/combined to account for possible discontinuities in individual images.

19. The system as set forth in claim 17 wherein results of a final reading/decoding of a detected ID/code from the ID features is performed on each of the version, and compared/combined to produce a complete code to account for errors resulting from possible discontinuities in individual images.

20. The system as set forth in claim 16 wherein each version of the image is processed by the vision processor to find and decode ID features based upon a plurality of discrete parameters that differ in each of multiple models, at least one result of the process being selected as a candidate.

21. The system as set forth in claim 16 further comprising a validator that combines decoded results from the ID features in a plurality of versions to determine validity of the decoded information.

22. The system as set forth in claim 1 wherein the sensors operate to acquire an image of the object based upon a level trigger mode that response to sensing by an upstream sensor of a leading edge and a trailing edge of the object passing through a sensing line, and based upon passing of each of the leading edge and the trailing edge through the sensing line and motion information provided by the motion conveyance triggers image acquisition so as to maintain a predetermined margin about an image of the object within a range of distance between the leading edge and the trailing edge.

23. A method for reading and decoding ID features located on a surface of a curved, sloped and/or annular object comprising the steps of:
generating, with a plurality of 3D sensors, operatively connected to a vision system processor, calibrated by calibration parameters, a stitched-together 3D image of a field of view in a common coordinate space;
moving the object and the 3D sensors in relative motion, and providing motion information to the vision system processor; and
locating ID features within a version of the 3D image with one or more discrete ID finder modules.

* * * * *